(12) United States Patent
Graybeal et al.

(10) Patent No.: US 11,962,585 B2
(45) Date of Patent: Apr. 16, 2024

(54) GUEST ONBOARDING OF DEVICES ONTO 3GPP-BASED NETWORKS WITH USE OF REALM-BASED DISCOVERY OF IDENTITY PROVIDERS AND MUTUAL AUTHENTICATION OF IDENTITY FEDERATION PEERS

(71) Applicant: Cisco Technology, Inc., San Jose, CA (US)

(72) Inventors: John Martin Graybeal, Califon, NJ (US); Bart A. Brinckman, Nevele (BE); Srinath Gundavelli, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 114 days.

(21) Appl. No.: 16/989,340

(22) Filed: Aug. 10, 2020

(65) Prior Publication Data
US 2021/0058391 A1 Feb. 25, 2021

Related U.S. Application Data

(60) Provisional application No. 62/889,100, filed on Aug. 20, 2019.

(51) Int. Cl.
*H04L 29/00* (2006.01)
*G06F 16/953* (2019.01)
(Continued)

(52) U.S. Cl.
CPC ........ *H04L 63/0869* (2013.01); *G06F 16/953* (2019.01); *H04L 61/4511* (2022.05);
(Continued)

(58) Field of Classification Search
CPC ............. H04L 63/0869; H04L 61/1511; H04L 63/0823; H04L 63/10; H04L 63/166;
(Continued)

(56) References Cited

U.S. PATENT DOCUMENTS 7,096,014 B2 8/2006 Haverinen et al.
9,980,133 B2 5/2018 Barrett et al.
(Continued)

FOREIGN PATENT DOCUMENTS

CN 108271230 A 7/2018
JP 6449739 B2 1/2019
(Continued)

OTHER PUBLICATIONS

3GPPTR33.980V9.0.0 3 GenerationPartnershipProject;TechnicalSpecificationGroupServices and System Aspects; Liberty Alliance and 3GPPSecurityInterworking;InterworkingofLibertyAllianceIdentityFederationFramework(ID-FF),Identity Web Services Framework (ID-WSF) and Generic Authentication Architecture(GAA) (Year: 2009).*

(Continued)

*Primary Examiner* — Jeffrey C Pwu
*Assistant Examiner* — Helai Salehi
(74) *Attorney, Agent, or Firm* — Edell, Shapiro & Finnan, LLC

(57) ABSTRACT

A Third Generation Partnership Project (3GPP) based network, such as an enterprise private 3GPP network, is operative to provide a guest onboarding of a device using a realm-based discovery of an identity provider and a mutual authentication of identity federation peers. A secure connection may be established between the peers so that the device may be authenticated based on credentials associated with a Subscriber Identity Module (SIM) provided by its Mobile Network Operator (MNO). Credentials may be extended to (Continued)

those associated with embedded SIMs (eSIMs), digital certificates from private enterprises, login and passwords, and identities from a wide range of identity providers. After device authentication, the 3GPP-based network is operative to select and enforce access policies according to an identity or other attribute of the device.

20 Claims, 17 Drawing Sheets

(51) Int. Cl.
    *H04L 9/40*     (2022.01)
    *H04L 61/4511*     (2022.01)
    *H04W 8/06*     (2009.01)
    *H04W 80/06*     (2009.01)

(52) U.S. Cl.
    CPC .......... *H04L 63/0823* (2013.01); *H04L 63/10* (2013.01); *H04L 63/166* (2013.01); *H04L 63/20* (2013.01); *H04W 8/06* (2013.01); *H04W 80/06* (2013.01)

(58) Field of Classification Search
    CPC . H04L 63/20; H04L 61/1588; H04L 63/0892; H04L 63/0815; G06F 16/953; H04W 8/06; H04W 80/06; H04W 60/04; H04W 12/06; H04W 12/086; H04W 12/72; H04W 8/18; H04W 12/084
    See application file for complete search history.

(56) References Cited

U.S. PATENT DOCUMENTS

| | | | |
|---|---|---|---|
| 10,609,634 | B2 | 3/2020 | Graybeal et al. |
| 10,616,764 | B2 | 4/2020 | Rommer et al. |
| 10,674,431 | B2 | 6/2020 | Sabeur et al. |
| 10,827,019 | B2 | 11/2020 | Rubin et al. |
| 2006/0121894 | A1 | 6/2006 | Ganesan |
| 2007/0097983 | A1 | 5/2007 | Nylander et al. |
| 2008/0076413 | A1 | 3/2008 | Jones |
| 2008/0101358 | A1 | 5/2008 | Van Ewijk et al. |
| 2009/0156253 | A1 | 6/2009 | Shi et al. |
| 2009/0191915 | A1 | 7/2009 | Abramson et al. |
| 2010/0281530 | A1 | 11/2010 | Tarkoma |
| 2011/0124313 | A1 | 5/2011 | Jones |
| 2012/0079569 | A1 | 3/2012 | Mendelovich et al. |
| 2012/0084449 | A1* | 4/2012 | Delos Reyes ....... H04W 12/062 709/229 |
| 2012/0106468 | A1 | 5/2012 | Engstrom et al. |
| 2014/0349611 | A1 | 11/2014 | Kant et al. |
| 2015/0092654 | A1 | 4/2015 | Ahmavaara |
| 2015/0302413 | A1 | 10/2015 | Dua |
| 2016/0065747 | A1 | 3/2016 | Haspekian et al. |
| 2017/0156105 | A1 | 6/2017 | Mustajarvi et al. |
| 2017/0230905 | A1 | 8/2017 | Pularikkal et al. |
| 2017/0238245 | A1* | 8/2017 | Mathai ................ H04L 61/4511 370/328 |
| 2017/0359773 | A1 | 12/2017 | Boodannavar et al. |
| 2018/0063776 | A1 | 3/2018 | Gupta |
| 2018/0109465 | A1 | 4/2018 | Gonguet et al. |
| 2018/0206166 | A1 | 7/2018 | Ganesan et al. |
| 2019/0141536 | A1* | 5/2019 | Bachmutsky ......... H04W 12/66 |
| 2019/0174314 | A1 | 6/2019 | Joseph et al. |
| 2019/0215692 | A1* | 7/2019 | Grayson ............... H04L 63/102 |
| 2019/0380033 | A1 | 12/2019 | Wu et al. |
| 2020/0022193 | A1 | 1/2020 | Ma et al. |
| 2020/0146009 | A1 | 5/2020 | Wiatrowski et al. |
| 2020/0163013 | A1 | 5/2020 | Grayson et al. |
| 2020/0296660 | A1 | 9/2020 | Wang et al. |
| 2021/0029531 | A1 | 1/2021 | Mote et al. |
| 2021/0058391 | A1 | 2/2021 | Graybeal et al. |
| 2021/0058776 | A1 | 2/2021 | Nair et al. |
| 2021/0099869 | A1 | 4/2021 | Palanigounder et al. |
| 2021/0120425 | A1 | 4/2021 | Fikouras et al. |
| 2021/0136583 | A1 | 5/2021 | Gundavelli et al. |

FOREIGN PATENT DOCUMENTS

| | | |
|---|---|---|
| WO | 2014160935 A2 | 10/2014 |
| WO | 2017220124 A1 | 12/2017 |
| WO | 2018164612 A1 | 9/2018 |
| WO | 2020046348 A1 | 3/2020 |
| WO | 2020221324 A1 | 11/2020 |
| WO | 2020231305 A1 | 11/2020 |
| WO | 2021087973 A1 | 5/2021 |
| WO | 2021089396 A1 | 5/2021 |
| WO | 2021094349 A1 | 5/2021 |

OTHER PUBLICATIONS

International Search Report and Written Opinion in counterpart International Application No. PCT/US2020/046093, dated Nov. 17, 2020, 15 pages.

Zdarsky, Frank A. et al., "Localization of Data and Control Plane Traffic in Enterprise Femtocell Networks", 2011 IEEE 73rd Vehicular Technology Conference (VTC Spring), https://ieeexplore.ieee.org/document/5956622, May 15, 2011, 5 pages.

Cooney, Michael, "Cisco moves Wi-Fi roaming technology to wireless broadband consortium", Mar. 20, 2020, 3 pages.

GillottResearch Inc., "Hotspot 2.0: Passing Go", Whitepaper, Published Fourth Quarter, 2012, Version 1.0, 15 pages.

Wireless Broadband Alliance, "Wi-Fi Roaming—from 'old school' to 'new opportunities'", 8 pages, retrieved from Internet Aug. 8, 2020; https://wballiance.com/wi-fi-roaming-from-old-school-to-new-opportunities/.

Wireless Broadband Alliance, "How does WBA OpenRoaming™ work?", 4 pages, retrieved from Internet Aug. 10, 2020; https://wballiance.com/openroaming/how-it-works/.

A. Gulbrandsen et al., "A DNS RR for specifying the location of services (DNS SRV)", Network Working Group, Request for Comments (RFC) 2782, Feb. 2000, 12 pages.

M. Mealling et al., "The Naming Authority Pointer (NAPTR) DNS Resource Record", Network Working Group, Request for Comments (RFC) 2915, Sep. 2000, 18 pages.

Ping Identity, "The Primer: Nuts and Bolts of Federated Identity Management", Ping Identity White Paper, 2008, 12 pages, retrieved from Internet Aug. 10, 2020.

Matt MacPherson, "The Next Generation Experience", Cisco, Jan. 2020, 54 pages.

OnGo, "CBRS Network Services Stage 2 and 3 Specification", CBRS Alliance, CBRSA-TS-1002, V3.1.0, Jun. 23, 2020, 55 pages.

OnGo, "CBRS Network Services Stage 2 and 3 Specification", CBRS Alliance, CBRSA-TS-1002, V3.0.0, Feb. 18, 2020, 55 pages.

3 Forum, "IMS-Based Services: Service Interoperability", International Interconnection Forum for Services over IP, Release 1.2, Jun. 2019, 35 pages.

"Official Document IR.67—DNS Guidelines for Service Providers and GRX and IPX Providers", GSM Association, Version 16.0, Jun. 15, 2020, 74 pages.

"IR.61 Wi-Fi Roaming Guidelines v11.0", GSM Association, Version 12.0, Sep. 27, 2017, 52 pages.

J. Arkko, et al., "Improved Extensible Authentication Protocol Method for 3rd Generation Authentication and Key Agreement (EAP-AKA')," Network Working Group, Request for Comments: 5448, Updates: 4187, Category: Informational, May 2009, 29 pages.

J. Arkko, et al., "Extensible Authentication Protocol Method for 3rd Generation Authentication and Key Agreement (EAP-AKA)," Network Working Group, Request for Comments:4187, Category: Informational, Jan. 2006, 79 pages.

3GPP, "3rd Generation Partnership Project; Technical Specification Group Core Network and Terminals; Numbering, addressing and identification; (Release 16)," 3GPP TS 23.003 V16.3.0, Jun. 2020, 141 pages.

"CBRS Alliance Indentifier Guidelines for Shared HNI," CBRS Alliance, CBRSA-TR-0100, V1.0.0, Nov. 27, 2018, 18 pages.

(56) References Cited

OTHER PUBLICATIONS

"LTE and EPC Roaming Guidelines," GSM Association, IR.88, Version 21.0, Jun. 5, 2020, 98 pages.
"Telephone Network and ISDN Operation, Numbering, Routing and Mobile Service," International Telecommunication Union, Identification Plan for Land Mobile Stations, ITU-T Recommendation E.212, Nov. 2, 2012, 9 pages.
Mealling, "Dynamic Delegation Discovery System (DDDS) Part Three: The Domain Name System (DNS) Database," The Internet Society, Network Working Group, Request for Comments: 3403, Category: Standards Track, Oct. 2002, 14 pages.
"Series E: Overall Network Operation, Telephone Service, Service Operation and Human Factors" International Telecommunication Union, ITU-T, E.212, Sep. 2016, 26 pages.
"Series E: Overall Network Operation, Telephone Service, Service Operation and Human Factors," International Telecommunication Union, ITU-T, E.212, Amendment 1, Jul. 2018, 28 pages.
"Series E: Overall Network Operation, Telephone Service, Service Operation and Human Factors," International Telecommunication Union, ITU-T, E.212, Amendment 2, Jun. 2020, 30 pages.
International Preliminary Report on Patentability for International Application No. PCT/US2020/046093, dated Mar. 3, 2022, 08 Pages.

* cited by examiner

PCC Architecture with Home Routed architecture

Diameter Roaming Implementation Architecture

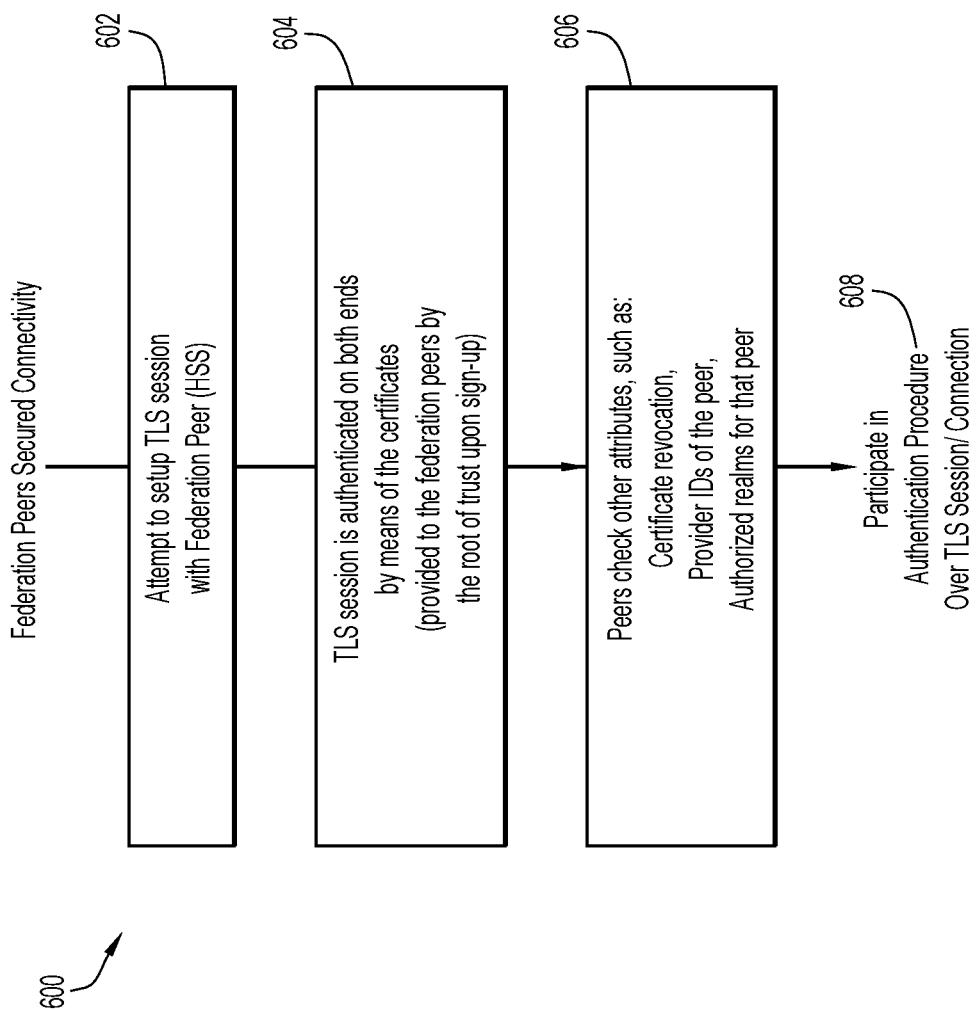

GUEST ONBOARDING OF DEVICES ONTO 3GPP-BASED NETWORKS WITH USE OF REALM-BASED DISCOVERY OF IDENTITY PROVIDERS AND MUTUAL AUTHENTICATION OF IDENTITY FEDERATION PEERS

CROSS-REFERENCE TO RELATED APPLICATIONS

This application claims priority to U.S. Provisional Application No. 62/889,100, filed Aug. 20, 2019, the entirety of which is incorporated herein by reference.

TECHNICAL FIELD

The present application relates generally to telecommunications, and more particularly to guest onboarding of devices onto Third Generation Partnership Project (3GPP) based networks using a realm-based discovery of identity providers and mutual authentication of identity federation peers.

BACKGROUND

Interest in private Third Generation Partnership Project (3GPP) networks is rapidly growing. Private 3GPP networks may include networks owned and/or operated by enterprises, industrials, neutral host entities, etc. Key functionalities, such as authentication, roaming, and identity-based policies based on pre-existing credentials may be subject to hindrances or limitations by mobile network operators (MNOs).

Typically, MNOs control their user devices and associated Subscriber Identity Modules (SIMs). Oftentimes, the business strategies of the MNOs lead them to not support device authentication or roaming onto private networks (e.g. private 3GPP networks). Rather, MNOs often prefer to host or manage the private networks on behalf of the enterprises. On the other hand, enterprises often need or want to have some level of control of the private networks that support their business-critical processes. Typically, if an enterprise does not enlist an MNO to host and manage their private network, user devices are prevented from authenticating onto the private network using their MNO-provided SIMs. Further, even an MNO-managed network faces authentication challenges for user devices seeking to roam onto their network using non-MNO credentials (e.g. enterprise, industrial, web-based, or other). Solutions that are based on current 3GPP roaming architectures may not be suitable, as scalability becomes an issue.

There is a need for techniques and mechanisms that address the issues discussed above as well as related issues.

BRIEF DESCRIPTION OF THE DRAWINGS

FIG. 6 is a flowchart for describing a more detailed method for use in providing a guest onboarding of devices onto 3GPP-based networks according to some implementations of the present disclosure, and particularly relating to establishing a secure connection with an identity federation peer based on a mutual authentication procedure between peers;

FIG. 7B-2 is an illustrative representation of a process flow diagram of part of a process flow of FIGS. 7B-1 through 7B-4, and particularly relating to a scenario where a visitor enters an enterprise business having a network;

FIG. 7B-3 is an illustrative representation of a process flow diagram of part of a process flow of FIGS. 7B-1 through 7B-4, and particularly relating to a realm-based discovery of an identity provider, a mutual authentication procedure between identity federation peers, a secure connection being established between the identity federation peers, and an authentication procedure being performed over the secure connection for authentication of the device based on credentials associated with its identity;

FIG. 7B-4 is an illustrative representation of a process flow diagram of part of a process flow of FIGS. 7B-1 through 7B-4, and particularly relating to a visitor successfully onboarded onto the (visited) 3GPP-based network and access policies being applied in response;

DESCRIPTION OF EXAMPLE EMBODIMENTS

Figure 1A:
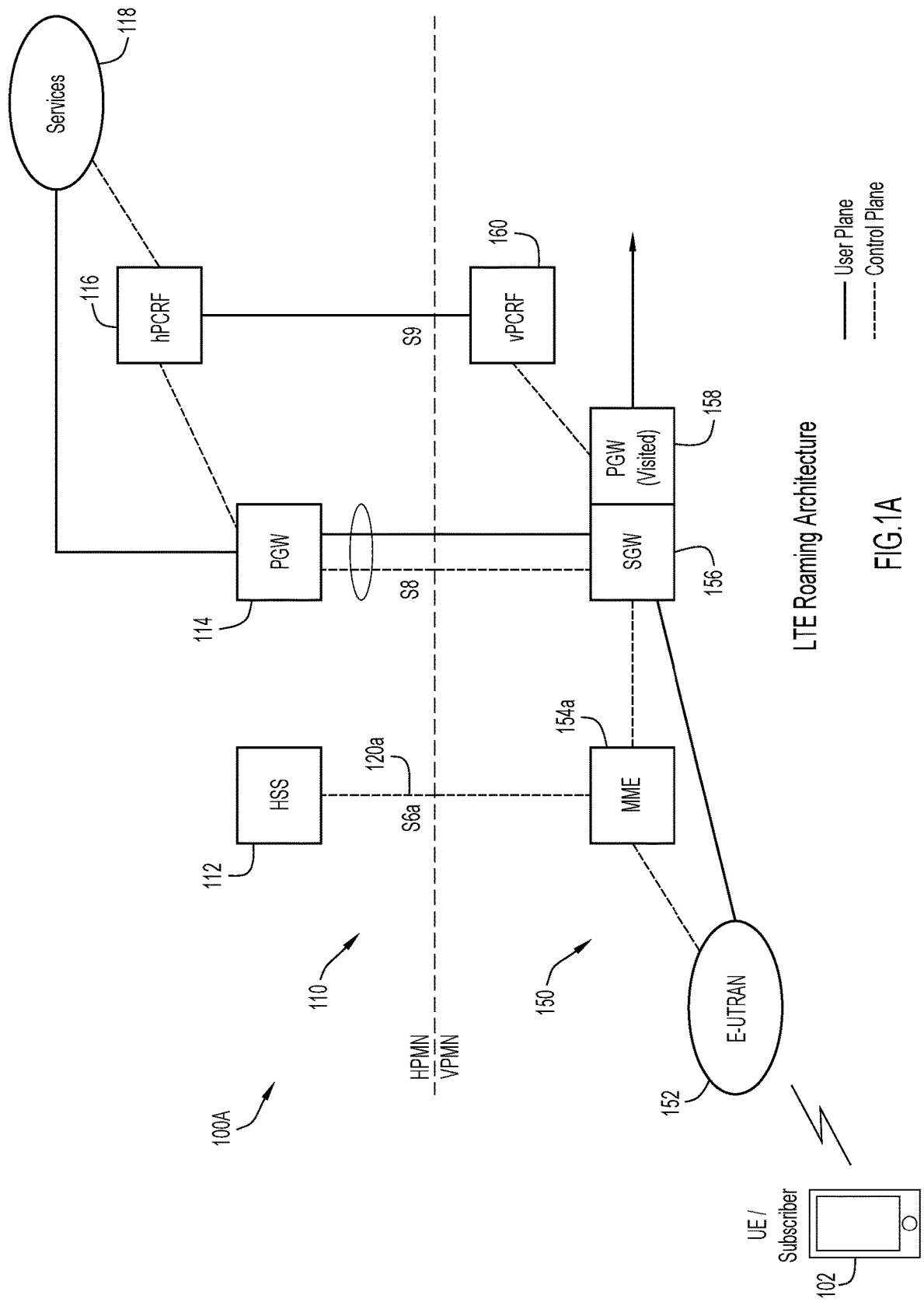
FIG. 1A is an illustrative representation of a mobile network architecture which is a Third Generation Partnership Project (3GPP) Long Term Evolution (LTE) roaming architecture, showing a home network of a subscriber associated with a user equipment (UE) and a visited network within which the subscriber or UE may roam.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

What are provided herein are scalable techniques and mechanisms of a public or private Third Generation Partnership Project (3GPP) based network to cost-effectively and securely authenticate against credentials of Subscriber Identity Modules (SIMs) provided by Mobile Network Operators (MNOs) of "guest" devices, as well as against other identities beyond MNO-provided SIMs (e.g. those of other enterprises and third-party identity providers). The techniques and mechanisms of the 3GPP-based network may further select and enforce appropriate (guest) access policies based on the credentials or other attributes of the devices.

According to at least some implementations, a 3GPP-based network may provide for a guest onboarding of a device using a realm-based discovery of an identity provider and a mutual authentication of identity federation peers. A secure connection may be established between the peers so that the device may be authenticated based on credentials associated with an MNO-provided SIM. Credentials may extend to those associated with embedded SIMs (eSIMs), digital certificates from private enterprises, login and passwords, and identities from a wide range of identity providers. Once the device is authenticated, the 3GPP-based network may select and enforce access policies based on an identity or other attribute of the device.

In some implementations, the techniques and mechanisms of the present disclosure may provide for a guest onboarding of devices in an enterprise private 3GPP-based network. In other implementations, the techniques and mechanisms of the present disclosure may provide for a guest onboarding for and/or between public 3GPP-based networks (e.g. as alternative roaming).

More detailed and alternative techniques and implementations are provided herein as described below.

EXAMPLE EMBODIMENTS

Figure 1B:
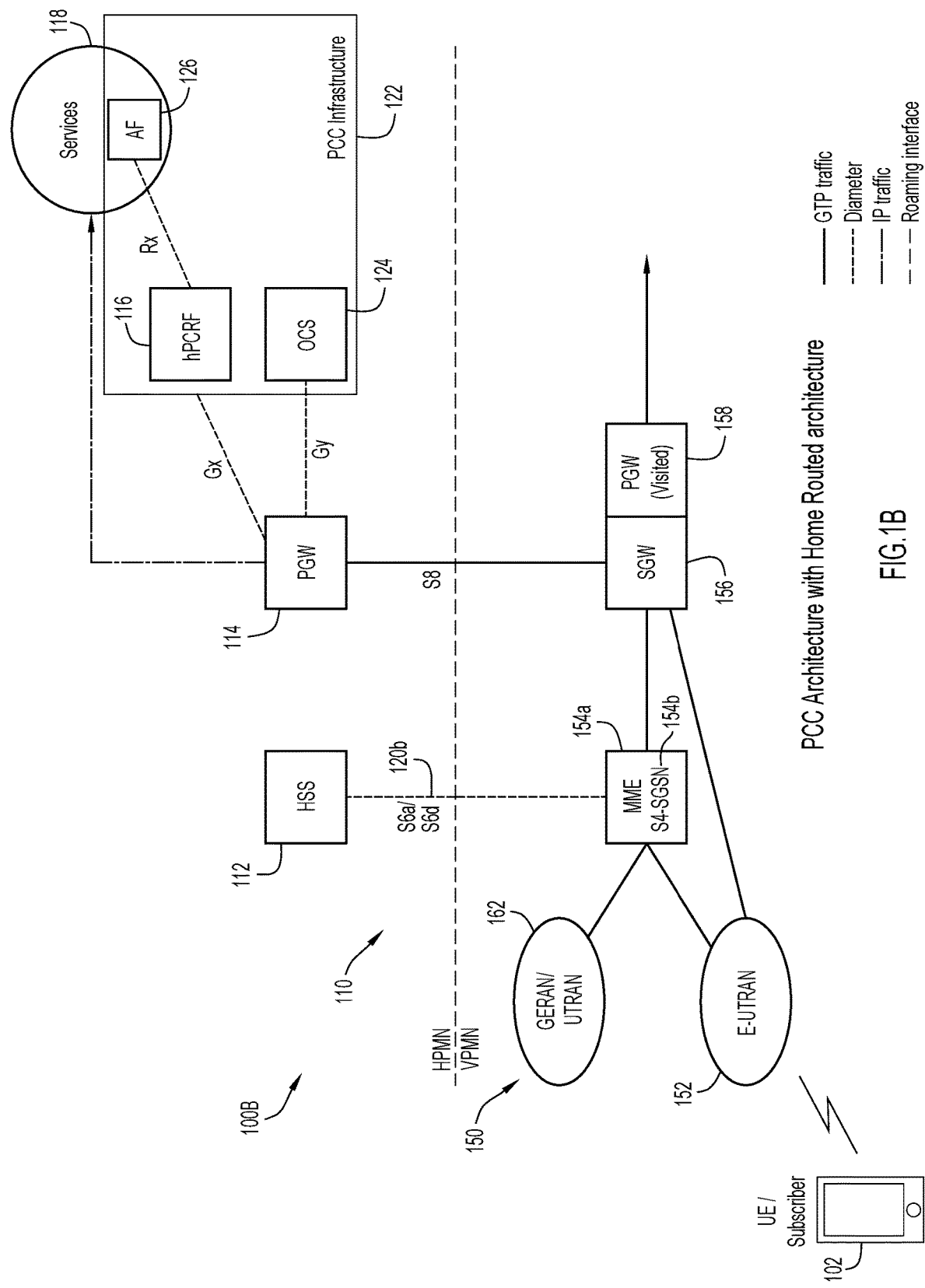
FIG. 1B is an illustrative representation of a mobile network architecture which is a Policy Control and Charging (PCC) architecture with home-routed architecture, showing the home network of the subscriber associated with the UE and the visited network within which the subscriber or UE may roam.

FIG. 1A is an illustrative representation of a mobile network architecture 100A which is a Long Term Evolution (LTE) roaming architecture according to Third Generation Partnership Project (3GPP) specifications. FIG. 1B is an illustrative representation of a mobile network architecture 100B which is a Policy Control and Charging (PCC) architecture with home-routed architecture. Note that the mobile network architectures of FIGS. 1A-1B are from the Global Systems for Mobile Communications (GSM) Association (GSMA), as "LTE and EPC Roaming Guidelines," Official Document IR.88, Version 19.0, 7 Jun. 2019.

Depicted in mobile network architecture 100A of FIG. 1A is a home network 110 (or Home Public Land Mobile Network or "HPLMN") of a subscriber associated with a user equipment (UE) 102 and a visited network 150 (or Visited PLMN or "VPLMN") within which the subscriber or UE 102 may roam. A network node arrangement of home network 110 includes a Home Subscriber Server (HSS) 112, a Packet Gateway (PGW) 114, a home Policy and Charging Rules Function (hPCRF) 116, and a network 118 for services. A network node arrangement of visited network 150 includes a Mobility Management Entity (MME) 154a, a Serving Gateway (SGW) 156, a visited PGW 158, and a visited PCRF (vPCRF) 160. In FIG. 1A, UE 102 of home network 110 is shown to be roaming in visited network 150 via a Evolved Universal Mobile Telecommunications System (UMTS) Terrestrial Radio Access Network (E-UTRAN) 152. User plane and control plane sessions and connections between nodes and/or functions are depicted in FIG. 1A. In particular, signaling between MME 154a and HSS 112 utilizes an S6a interface 120a, signaling between SGW 156 and PGW 114 utilizes an S8 interface, and signaling between vPCRF 160 and hPCRF 116 utilizes an S9 interface.

Mobile network architecture 100B of FIG. 1B is similar to that shown and described in relation to FIG. 1A, with the following modifications. Radio access may be further facilitated with use of a GSM Enhanced Data rates for GSM Evolution (EDGE) Radio Access Network (GERAN)/UTRAN 162. MME 154a may further include functionality associated with an S4-SGSN 154b, where SGSN refers to a Serving General Packet Radio Service (GPRS) Support Node (SGSN). An S4 interface is an interface defined between an SGSN and an SGW; S4-SGSN refers to a release of SGSN that has at least one set of S4/S3/S16 interfaces enabled. Signaling with MME 154a/S4-SGSN 154b utilizes an S6a/S6d interface 120b, where S6d refers to the interface between an SGSN and an HSS. Further, mobile network architecture 100B omits the visited PGW and vPCRF of FIG. 1A, and defines a PCC infrastructure 122 to include hPCRF 116, an Online Charging System (OCS) 124, and an Application Function (AF) 126. Signaling between PGW 114 and hPCRF 116 utilizes a Gx interface, signaling between PGW 114 and OCS 124 utilizes a Gy interface, and signaling between hPCRF 116 and AF 126 utilizes an Rx interface.

For roaming of UE 102 in visited network 150, authentication and signaling typically occurs between MME 154a of visited network 150 and HSS 112 of home network 110 using the S6a interface (FIG. 1A) or S6a/S6d interface (see FIG. 1B).

Figure 2:
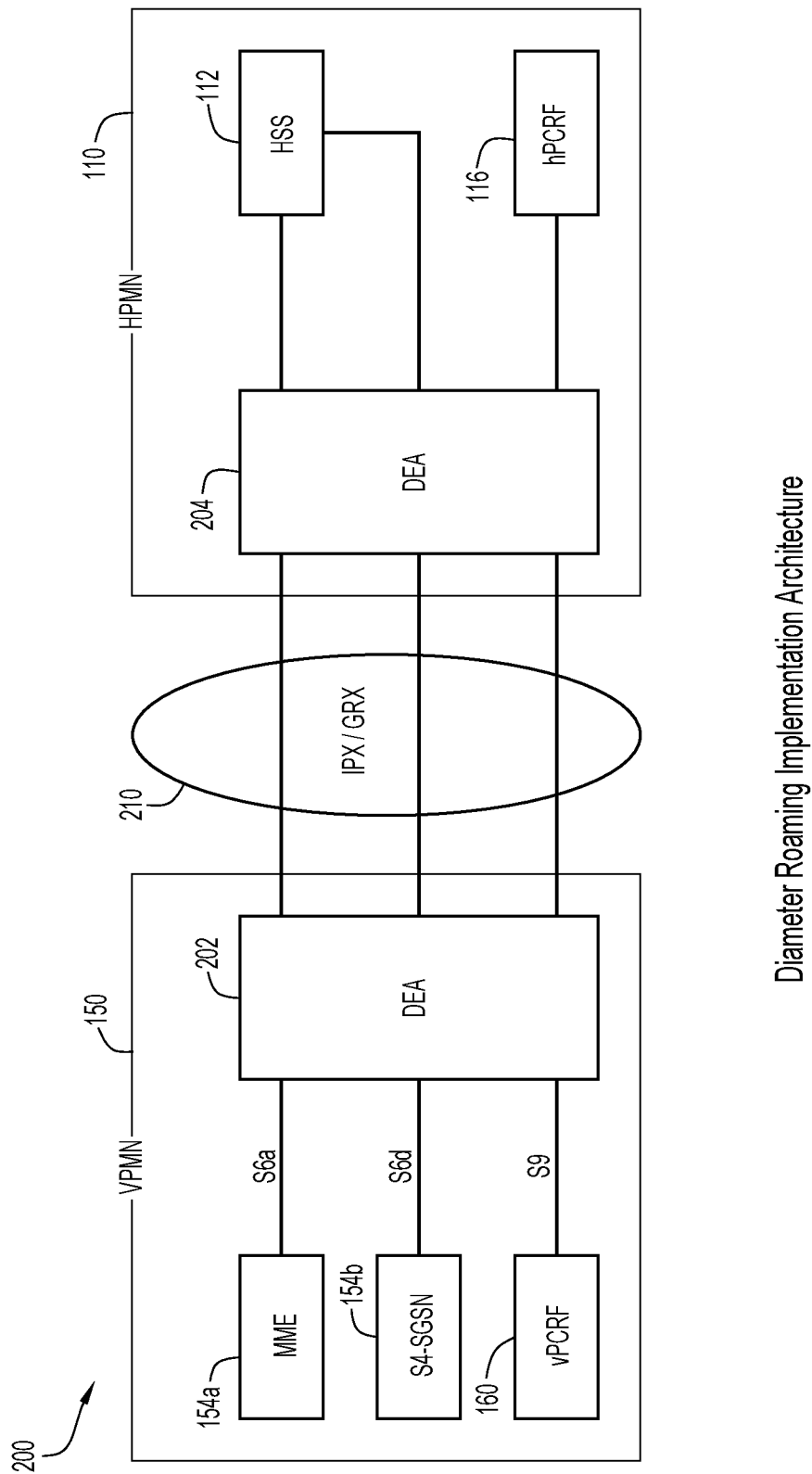
FIG. 2 is an illustrative representation of a diameter roaming implementation architecture showing an IPX (i.e. an IP Exchange) and a GRX (i.e. a General Packet Radio Service or "GPRS" Roaming Exchange) which may sit on an S6a/S6d interface between the home network and the visited network (see FIGS. 1A-1B)

FIG. 2 is an illustrative representation of a diameter roaming implementation architecture 200. Diameter roaming implementation architecture 200 of FIG. 2 illustrates the use of an IPX (i.e. an IP Exchange) and a GRX (i.e. a General Packet Radio Service or "GPRS" Roaming Exchange) (together indicated as an IPX/GRS 210 in FIG. 2) which may sit on the S6a/S6d interface between visited network 150 and home network 110. Diameter Edge Agents (DEAs) 202 and 204 (or Diameter Routing Agents "DRAs") may be used to interface between visited network 150 and home network 110.

Today, roaming between two different service providers works through use of IPX/GRX providers. IPX/GRX providers have pre-configured connections to and between various Mobile Network Operators (MNOs) who have roaming agreements established amongst each other. IPX/GRX connections are typically pre-configured because (1) there is not a very large number of MNOs (e.g. several hundred worldwide) and each MNO typically has only a modest number of roaming partners; (2) each MNO typically has on the order of millions of subscribers, and therefore, roaming events occur regularly; and (3) MNOs have to establish business agreements amongst each other for roaming, which involves charging and network connections for home-routed traffic for subscribers. An IPX/GRX provider helps an MNO when they need to add or remove roaming partners; the MNO's own network connection to the IPX/GRX remains "as is" and the IPX/GRX simply adds or removes communication between the relevant MNO pair.

Consider the possibility of using the same or similar roaming architecture (e.g. FIGS. 1A-1B and 2) in relation to enterprise private networks (e.g. enterprise private 3GPP-based networks). It is understood that, in the future, the number of enterprise private networks will be large (e.g. in the hundreds of thousands to millions), and therefore, the number of roaming pairs may be extremely large. On the other hand, the number of their employees and devices will be far smaller than for MNO subscribers, so roaming events between pairs of enterprises (or between enterprise and an identity provider) will be less frequent than for an MNO. Some enterprise private networks may or may not want to home-route their traffic (e.g. many may not), and some visited enterprise private networks may or may not charge for subscriber traffic. Other concerns, situations, or needs may apply, including situations where the guest device has an identity provider (e.g. Apple, Facebook, etc.) to which there may not be a home network to route traffic. Two different enterprises (or an enterprise and an identity provider) may have a business relationship, but they may not want to offer all of the services that an IPX/GRX allows. Further, while enterprises are generally willing to manage authentication for their own employees, they are generally unable and/or unwilling to take on the complexity of managing authentication for guests from a large number of possible sources (e.g. employees of business partners, contractors, Internet of Things "IoT" devices controlled by enterprises, etc.).

Present 3GPP specifications address authentication by mobile service providers, by operator roaming partners (e.g. via IPX), and by private enterprises (via certificates). For devices of an enterprise, a digital certificate approach may suffice. However, the 3GPP solutions are limited with respect to devices that are owned and/or controlled by other enterprises or by MNOs.

Accordingly, what are needed are scalable techniques and mechanisms for a 3GPP-based network to cost-effectively and securely authenticate guest devices against credentials of MNO-provided SIMs as well as other identities.

Figure 3:
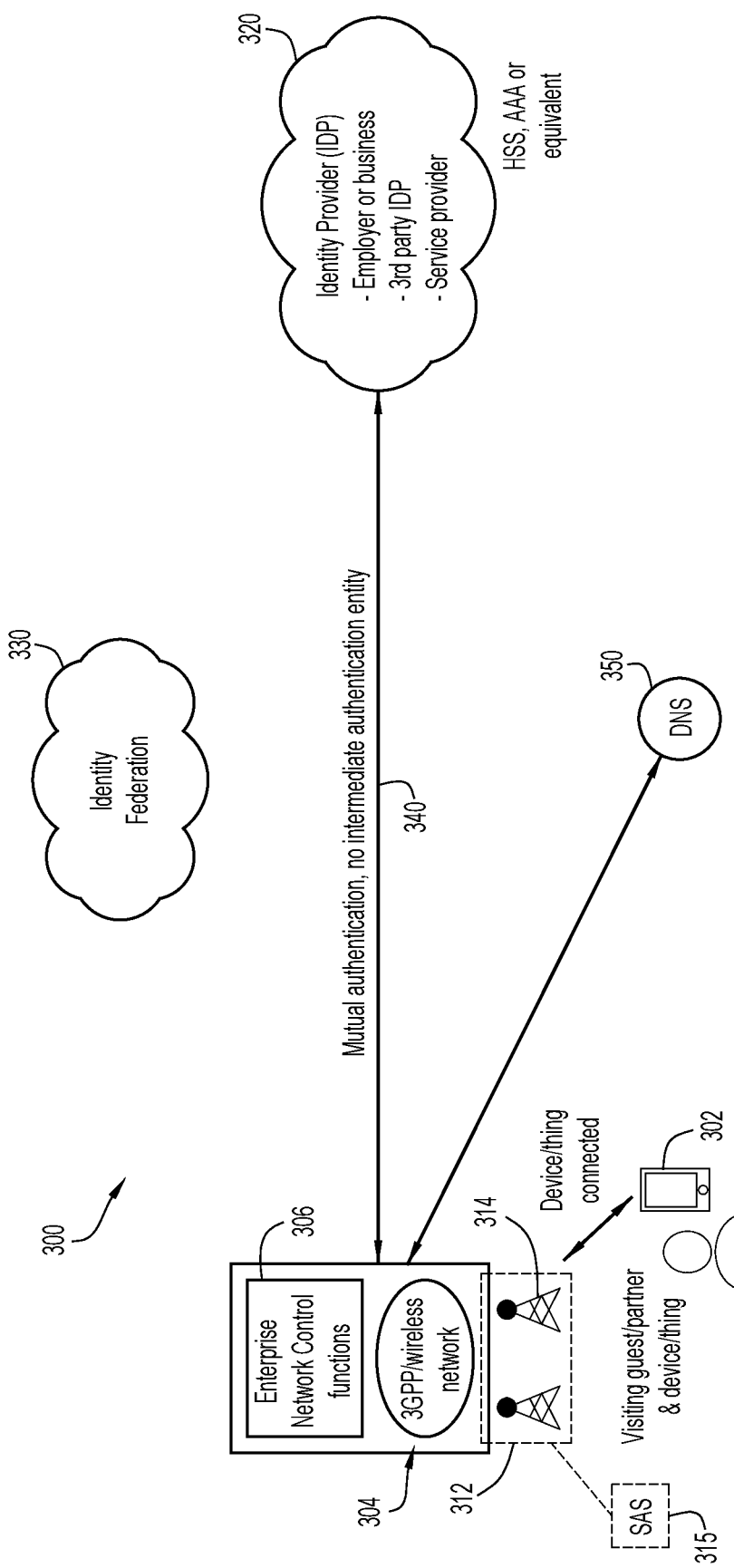
FIG. 3 is an illustrative representation of a logical architecture for guest onboarding of devices onto 3GPP-based networks according to some implementations of the present disclosure.

FIG. 3 is an illustrative representation of a general network architecture 300 for guest onboarding of devices onto 3GPP-based networks according to some implementations of the present disclosure. In FIG. 3, network architecture 300 of FIG. 3 includes a 3GPP-based network 304 (e.g. an access provider), an identity provider 320, and an identity federation 330.

The 3GPP-based network 304 of FIG. 3 may include at least part of a (private) mobile core network and a radio access network (RAN) 312. RAN 312 may include one or more base stations (alternatively referred to as access points or "APs"), such as a base station 314, which may be or include eNodeBs (eNBs) or gNodeBs (gNBs). The core network may include one or more (enterprise) network control functions 306. Identity federation 330 may be associated with an identity federation network, service, and/or servers. Similarly, identity provider 320 may be associated with an identity provider network, service, and/or servers. Identity provider 320 and identity federation 330 may be located outside of and/or external to 3GPP-based network 304. Identity provider 320 may be associated with an employer or business, a third-party identity provider, or a service provider (e.g. an MNO). In some implementations, the identity provider 320 may include an HSS, an Authentication, Authorization and Accounting (AAA) server, or equivalent. Although only a single identity provider is shown in FIG. 3, the 3GPP-based network 304 may interact and communicate with a plurality of different identity providers that are registered in the identity federation 330.

In FIG. 3, device 302 may attempt to communicate in the 3GPP-based network 304 via RAN 312 (e.g. via base station 314 as shown). The device may be a user device, such as a UE, an Internet of Things (IoT) device, or a machine-to-machine (M2M) device, to name but a few. In the present example, device 302 does not have credentials which are recognizable (e.g. not known or not pre-established) in or by 3GPP-based network 304. According to implementations of the present disclosure, device 302 may be onboarded as a guest in the 3GPP-based network 304 with use of a realm-based discovery of identity provider(s) and a mutual authentication of identity federation peers. The realm-based discovery of identity provider 320 may be performed based on an identity of device 302 using a domain name system (DNS) server 350 or equivalent. The relevant peers of identity federation 330 to be mutually authenticated are associated with 3GPP-based network 304 and identity provider 320. Here, a mutual authentication procedure 340 may be performed between these peers and, based on a positive result, a secure connection may be established between the peers. An authentication procedure between 3GPP-based network 304 and identity provider 320 may be performed over the secure connection for authenticating device 302 in 3GPP-based network 304. Device access to 3GPP-based network 304 may be permitted or denied based on a result of the authentication procedure. If permitted, one or more policies for device access and/or communications in 3GPP-based network 304 may be applied based on the identity of device 302.

Figure 4:
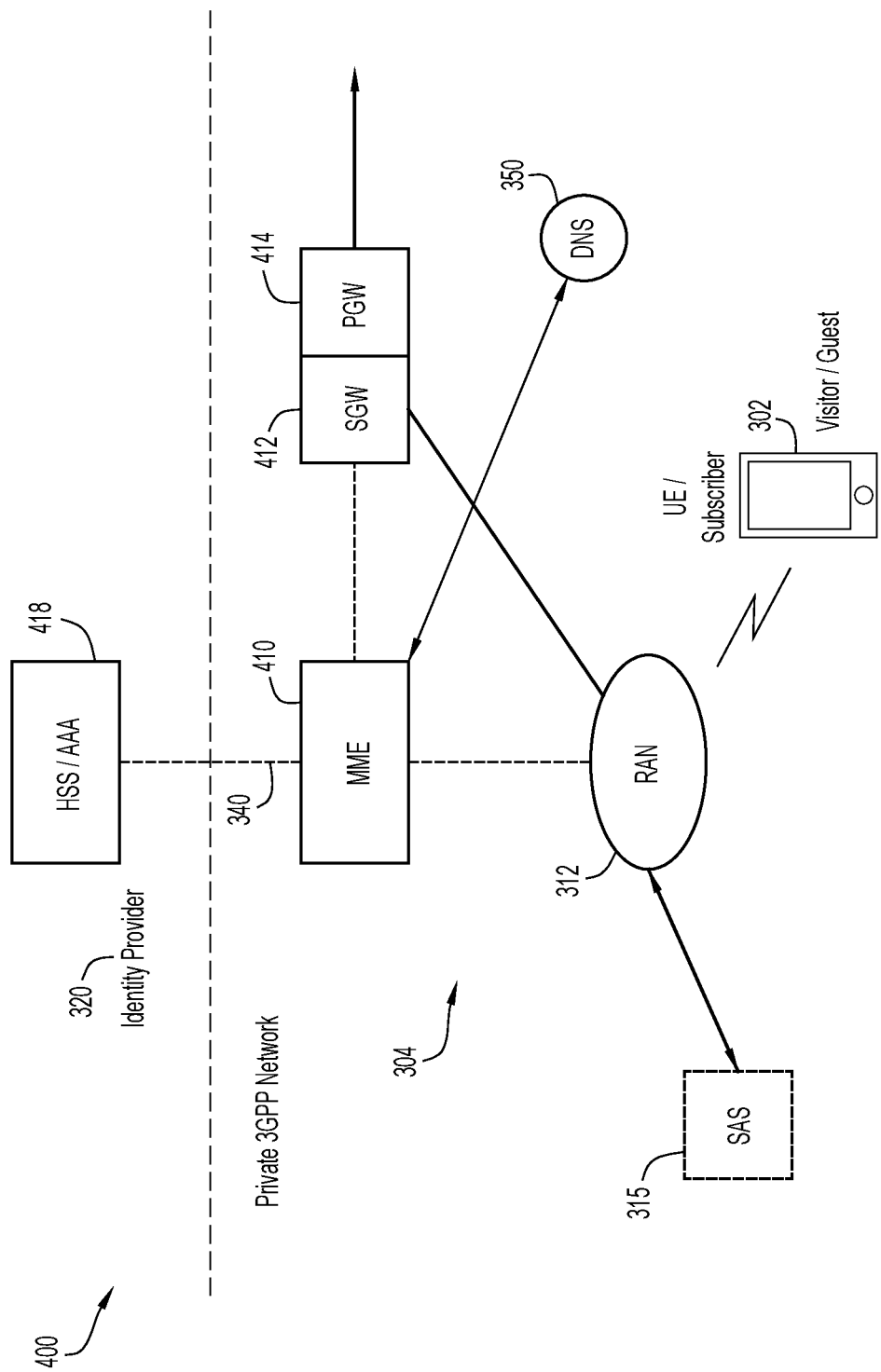
FIG. 4 is an illustrative representation of a logical architecture for guest onboarding of devices onto 3GPP-based networks according to some implementations of the present disclosure, where the 3GPP-based network is a private 3GPP-based network which is based on an LTE and/or Evolved Packet Core (EPC) architecture.

A more specific network architecture for guest onboarding according to the present disclosure is now shown and described in relation to FIG. 4. In particular, FIG. 4 is an illustrative representation of an example network architecture 400 for guest onboarding of devices onto a 3GPP-based network which is or includes an LTE/Evolved Packet Core (EPC) architecture. In the example implementation of FIG. 4, 3GPP-based network 304 includes RAN 312 and a mobile core having an MME 410, a SGW 412, and a PGW 414. Here, the SGW/PGW configuration is provided entirely within 3GPP-based network 304. Other options are realizable, for example, those involving a managed services provider (MSP), a Fifth Generation (5G) Control and User Plane Separation (CUPS) architecture, etc.

Identity provider 320 is outside of or external to 3GPP-based network 304. In the example implementation, identity provider 320 provides an HSS 418 (or AAA server) for authentication of device 302. More particularly, a subscriber associated with device 302 (e.g. a user device, such as a UE) may have a subscription with an MNO, where device 302 includes an MNO-provided SIM. In some implementations, the MNO of device 302 may be associated with identity provider 320. In this example implementation, device 302 may be authenticated for guest access to 3GPP-based network 304 based on credentials associated with its MNO-provided SIM.

To begin the guest onboarding of device 302 in FIG. 4, MME 410 may receive a message indicating a request for a connection, attachment, service, or authentication with or via 3GPP-based network 304. The message may include an identity associated with device 302. The message may be received from device 302 via RAN 312. In some implementations, the message indicating an attach request and/or from a message which is an Initial UE message. MME 410 may obtain the identity associated with device 302 from the message. A realm-based discovery of an identity provider (e.g. identity provider 320) may then be performed based on the identity associated with device 302. Here, a realm name of a realm may be selected or derived based on information in the identity. In some implementations, the realm name may be selected or derived from an IMSI, a realm name, or a domain name in the identity of device 302.

Based on one or more queries made to DNS server 350, an address of a server that is mapped to the realm name and provides a suitable authentication service may be obtained. The server may be or be associated with a peer of an identity provider 320 which is registered in the identity federation. In this example implementation, the discovered server of identity provider 320 is HSS 418.

In some implementations, any one or more (or all) of the following steps may be used for discovering the server that is or is associated with the peer of identity provider 320 in the identity federation. For one, a request for a record lookup based on the realm name of the realm may be sent to DNS server 350, and a response including one or more records indicating one or more servers or host servers (having host names) respectively associated with one or more authentication services may be received from DNS server 350. In preferred implementations, the record lookup may be a NAPTR record lookup for one or more NAPTR records. In some implementations, the record lookup may be associated with host servers that provide an authentication service, such as an AAA service. In addition, a request for a service record lookup based on a selected one of the one or more may then be sent to DNS server 350, and a response including one or more service records may be received from DNS server 350. In preferred implementations, the service record lookup may be a SRV record lookup for one or more SRV records. In some implementations, the service record lookup may be associated with host servers that provide a particular type of authentication service, including a Remote Authentication Dial-In User Service (RADIUS) service, a Diameter service, a Representation State Transfer (REST) Application Programming Interface (API) authentication service, or an open standard protocol for authorization service or OAuth (e.g. OAuth 2.0). Further, a request for an address record lookup based on a selected one of the one or more service records may then be sent to DNS server 350, and a response including the address of the host server (e.g. HSS 418) may be received from DNS server 350.

Using the address, MME 410 may then contact HSS 418 to participate in a mutual authentication procedure 340. Here, MME 410 and HSS 418 may communicate over a network, such as a wide area network (WAN) (e.g. the Internet). A secure connection may be established between MME 410 and HSS 418 based on a result of performing the mutual authentication procedure 340 between MME 410 and HSS 418 (i.e. peers of the identity federation). In the mutual authentication procedure 340, digital certificates may be exchanged for verification. In some implementations, a Transport Layer Security (TLS) protocol may be utilized for establishing a secure connection which is a TLS connection. Once the secure connection is established, an authentication procedure may be performed over the secure connection for authenticating device 302 based on the credentials associated with its MNO-provided SIM. MME 410 may permit or deny the device access to 3GPP-based network 304 based on a result of the authentication procedure. One or more policies for device access and/or communications in 3GPP-based network 304 may be applied based on the identity.

In some implementations of FIG. 4, 3GPP-based network 304 may be an enterprise private 3GPP network operative in a shared spectrum, such as a Citizens Broadcast Radio Services (CBRS) band. Spectrum sharing in a CBRS network may be facilitated with use of a spectrum access system (SAS) 315 which is outside of or external to 3GPP-based network 304. SAS 315 is configured to authorize and manage the use of spectrum of CBRS base stations (or Citizens Broadband Radio Service Devices "CBSDs") across different CBRS networks. CBRS provides for use of a 150 MHz-wide broadcast band in the 3550-3700 MHz frequency range, i.e. Time Division (TD) LTE (TD-LTE) band "48." There are three types of users allowed to access this spectrum, including incumbent users, Priority Access License (PAL) users, and General Authorized Access (GAA) users. SAS 315 serves to protect incumbents from interference from lower-tier PAL and GAA users, and protects PAL users from interference from other PAL and GAA users. The SAS 315 maintains database information of spectrum usage by incumbent, PAL, and GAA users in all census tracts (or areas) and allocates channels to base stations (or CBSDs) according to a variety of rules. Accordingly, the techniques and mechanisms herein may be provided for in a (local) private 3GPP network operating in a shared spectrum. The shared spectrum may be the CBRS band, which is controlled according to SAS 315 configured to authorize and manage use of the CBRS band across different CBRS networks.

In other implementations of FIG. 4, 3GPP-based network 304 may be an enterprise private 3GPP network operative in a spectrum different from the CBRS shared spectrum. Other suitable spectrum categories include an unlicensed spectrum (e.g. 2.4, 5, 6, and 60 GHz, and/or newly-available bands in the future); a traditional-type of licensed spectrum for service providers (e.g. existing or newly-available band in the future); a different type of shared band of spectrum; or a locally-licensed spectrum, for example, aimed for use by local entities and businesses (e.g. a locally-licensed spectrum currently known and/or used in Germany, U.K., Japan, etc.).

Accordingly, techniques and mechanisms of the present disclosure are provided for the guest onboarding of devices onto 3GPP-based networks using realm-based discovery of identity providers and mutual authentication of identity federation peers. According to some implementations, the techniques and mechanisms of the present disclosure may involve (1) a (e.g. dynamic) discovery of an identity provider based on a realm name of a realm that is selected or derived based on information contained in (part of) an identity of the device, such as (a) realm: e.g. <IMSI>@<realm>12345678901@mnc001.mcc201.3gppnetwork.org, and (b) part of the identity: e.g. for IMSI 12345678901 could translate to a Mobile Country Code (MCC) of 123, a Mobile Network Codes (MNC) of 45, and other significant bits; (2) a mutual authentication between identity federation peers by means of digital certificates, issued by a trusted root; and (3) a creation of a secure communication channel between access provider (e.g. a private or hybrid cloud) and identity provider (e.g. a hybrid/public cloud), for performing authentication of the device based on credentials associated with the identity.

Device access to the 3GPP-based network may be permitted or denied based on a result of the authentication. A permanent identity and/or other identities or attributes may be communicated to the 3GPP-based network in response to a positive authentication. These "extended" identities (e.g. the initial identity and/or any subsequently-received permanent identity and/or attributes) may provide the 3GPP-based network with information beyond what is normally included by 3GPP-based network policy platforms. For example, the information may include or indicate an enterprise role, a business relationship, or other. Accordingly, a 3GPP-based network may make use of such extended identities for setting and enforcing access policies for the guest devices. Setting and enforcing access policies may include or involve Quality of Service (QoS), access connection lists such as allowed lists and/or disallowed lists, inline services, security policies, geolocation and location policies, throughput and bandwidth policies, segmentation, etc.

Figure 5:
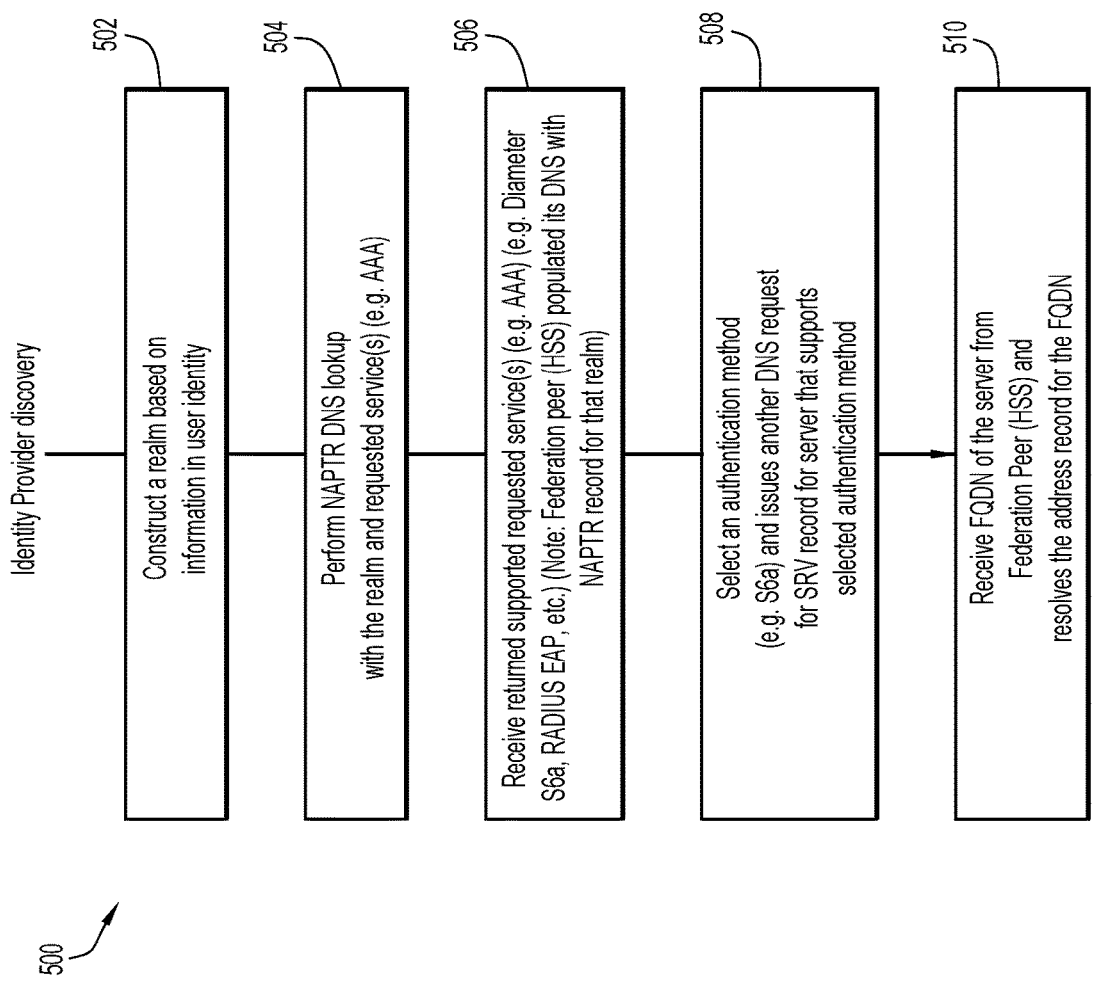
FIG. 5 is a flowchart for describing a more detailed method for use in providing a guest onboarding of devices onto 3GPP-based networks according to some implementations of the present disclosure, and particularly relating to a realm-based discovery of an identity federation peer associated with an identity provider.

FIG. 5 is a flowchart 500 for describing a more detailed method for use in providing a guest onboarding of devices onto 3GPP-based networks according to some implementations of the present disclosure, particularly relating to a realm-based discovery of an identity federation peer associated with an identity provider. The method may be performed by one or more network nodes or computing devices of the 3GPP-based network (e.g. the access provider). More particularly, the method may be performed by one or more control plane functions of the 3GPP-based network, such as or including a control plane function for mobility management (e.g. an MME in an LTE/EPC based network, or an Access and Mobility Management Function "AMF" in a Fifth Generation "5G" based network). The method may be embodied in a computer program product which includes a non-transitory computer readable medium and instructions stored in the non-transitory computer readable medium, where the instructions are executable by one or more processors for performing the method. Various detailed and alternative implementations of the method of FIG. 5 may be realized with use of any of the features, details, components and architectures described in relation to the other figures.

The method of FIG. 5 may relate to what is referred to as a technique or mechanism for Identity Provider Discovery. Beginning at a start block of FIG. 5, an MME (or proxy on the MME side) may construct a realm name of a realm based on information in an identity associated with a device (step 502 of FIG. 5). The identity associated with the device may be obtained from a message received from the device for network or service access (e.g. a message for connection or attachment to the network). In some implementations, the construction (e.g. or selection or derivation) of the realm name may be performed using one or more of the two techniques described above (e.g. based on identity such as realm, number, or IMSI) or other suitable technique. The MME may then perform a DNS record lookup for one or more records associated with the realm name and/or a requested service or protocol (step 504 of FIG. 5). The DNS record lookup may be a Name Authority Pointer (NAPTR) record lookup. The requested service may be a requested authorization service, for example, an AAA service. Note that the identity provider (e.g. the peer or identity federation peer, such as an HSS) may have pre-populated DNS server 350 with one or more NAPTR records associated with the realm. Thus, the DNS query will return all of the one or more different types of AAA service(s) and/or protocols that the identity provider supports (step 506 of FIG. 5). Different types of AAA services include, for example, Diameter S6a, RADIUS Extendible Authentication Protocol (EAP), or multiple types. If multiple services exist, the MME may select one of the different types of AAA services (e.g. according to a requirement or preference). In the example described, the MME may select "Diameter S6a." The MME may then issue another DNS request, this time for an Service Record (SRV) record, in attempt to identify a server that supports Diameter S6a for the realm (step 508 of FIG. 5). Subsequently, the MME may receive a Fully Qualified Domain Name (FQDN) associated with the server and obtain an address record for the FQDN (step 510 of FIG. 5). Thus, the MME has obtained the address of the server of the identity provider to which to connect and the type of protocol to authenticate the device.

FIG. 6 is a flowchart 600 for describing a more detailed method for use in providing a guest onboarding of devices onto 3GPP-based networks according to some implementations of the present disclosure, and particularly relating to establishing a secure connection with an identity federation peer based on a mutual authentication procedure between identity federation peers. The method of FIG. 6 may follow the method of FIG. 5 just described. Similar to the method of FIG. 5, the method of FIG. 6 may be performed by one or more network nodes or computing devices of the 3GPP-based network (e.g. the access provider). In particular, the method may be performed by one or more control plane functions of the 3GPP-based network, such as or including a control plane function for mobility management (e.g. an MME in an LTE/EPC based network, or an AMF in a 5G-based network). The method may be embodied in a computer program product which includes a non-transitory computer readable medium and instructions stored in the non-transitory computer readable medium, where the instructions are executable by one or more processors for performing the method. Various detailed and alternative implementations of the method of FIG. 6 may be realized with use of any of the features, details, components and architectures described in relation to the other figures.

The method of FIG. 6 may relate to what is referred to as a technique or mechanism for Federation Peers Secured Connectivity. The MME may attempt to establish a secure connection and/or session with the server (i.e. the identity federation peer, and here, an HSS) (step 602 of FIG. 6). In some implementations, the secure connection and/or session may be a secure TLS connection/TLS session. The TLS connection may be authenticated on both ends by means of digital certificates (step 604 of FIG. 6). Note that the digital certifications may have been previously provided to the identity federation peers (e.g. by the root of trust) during registration with the identity federation, where verification was provided by the root of trust. Apart from the certificate chain and certificate validity, the peers may check other attributes, such as certificate revocation, provider ID's of the peer, and authorized realms for that peer (step 606 of FIG. 6). Once the secure TLS connection is set up, an authentication procedure (e.g. S6a) may occur over the TLS connection (step 608 of FIG. 6). Device access to the 3GPP-based network may be permitted or denied based on a result of the authentication procedure.

In additional or alternative implementations of the above (e.g. step 606 of FIG. 6), the technique may be applied more generally to "signaling" over the secure connection, as well as policy peering, settlement, and other use cases.

Figure 7A:
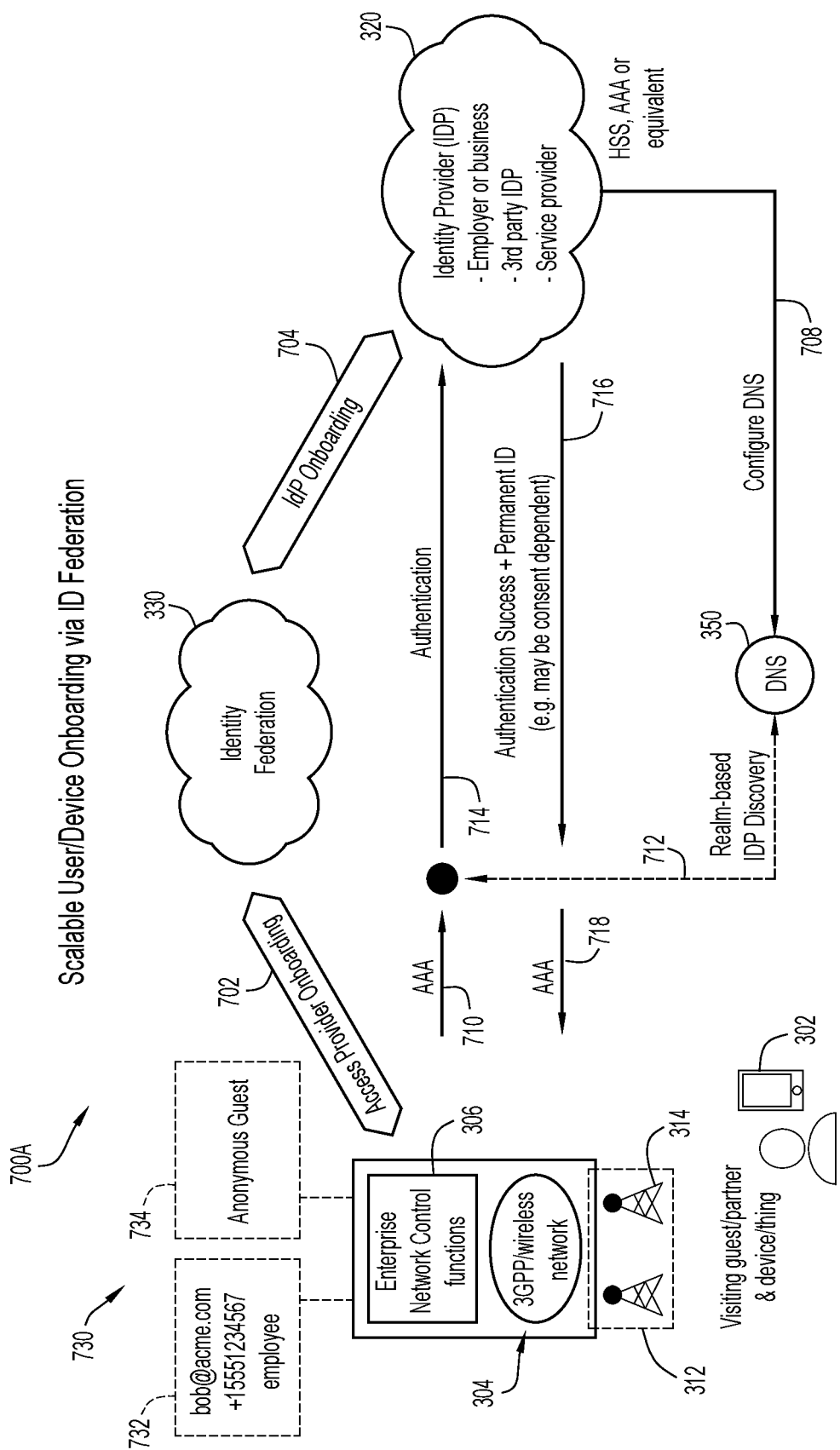
FIG. 7A is an illustrative representation of a process flow diagram of a process flow for use in guest onboarding of devices onto 3GPP-based networks using realm-based discovery of identity providers and mutual authentication of identity federation peers according to some implementations.

FIG. 7A is an illustrative representation of a process flow diagram 700A of a process flow for use in guest onboarding of devices onto 3GPP-based networks using realm-based discovery of identity providers and mutual authentication of identity federation peers according to some implementations. Relatedly, FIGS. 7B-1 through 7B-4 are process flow diagrams of the process flow of FIG. 7A for guest onboarding of devices, provided in an ordered sequence.

Figures 1, 7B:
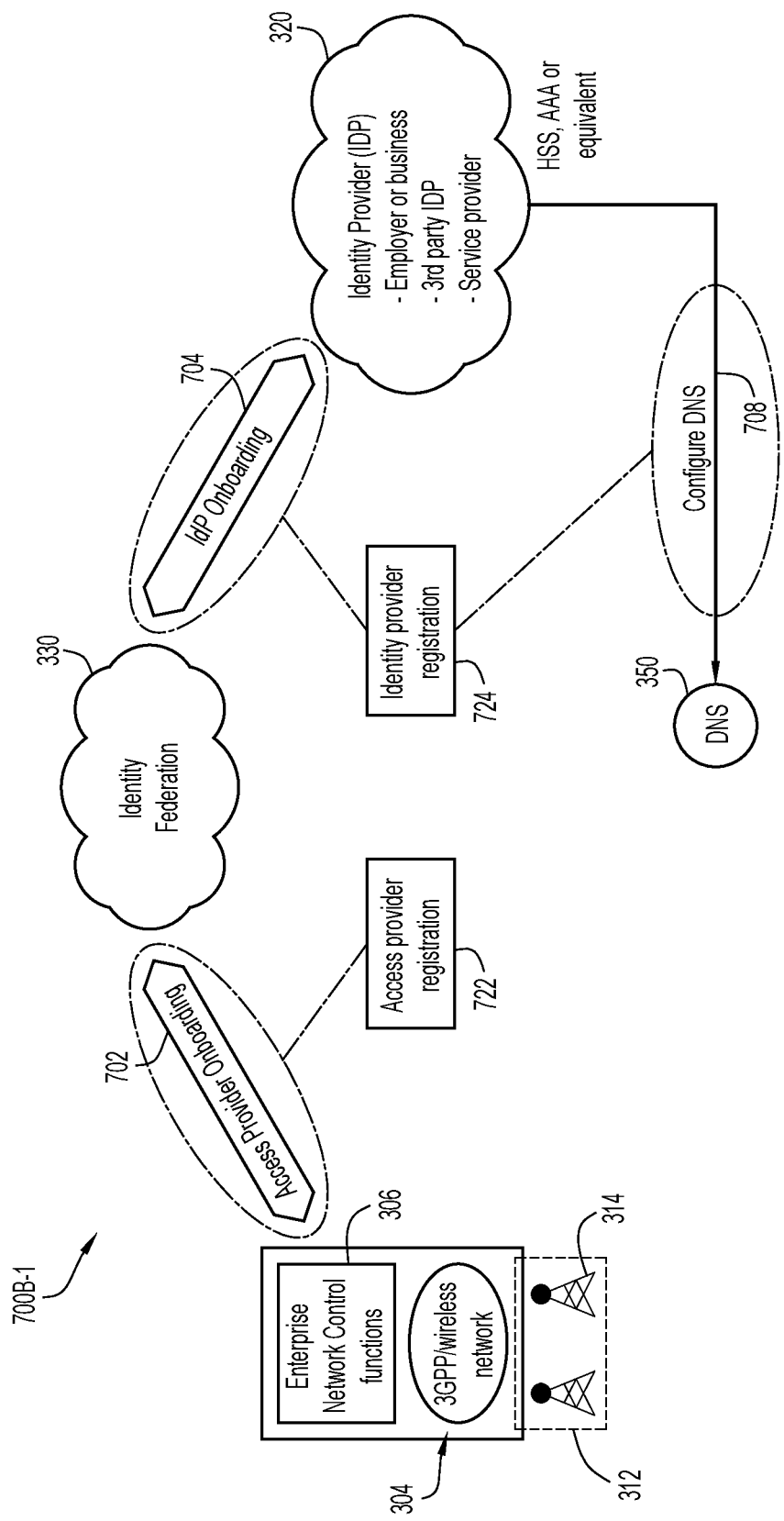
FIG. 7B-1 is an illustrative representation of a process flow diagram of part of a process flow of FIGS. 7B-1 through 7B-4, and particularly relating to an initial configuration and/or registration steps for access providers (e.g. private 3GPP-based networks) and identity providers.
Figures 2, 7B:
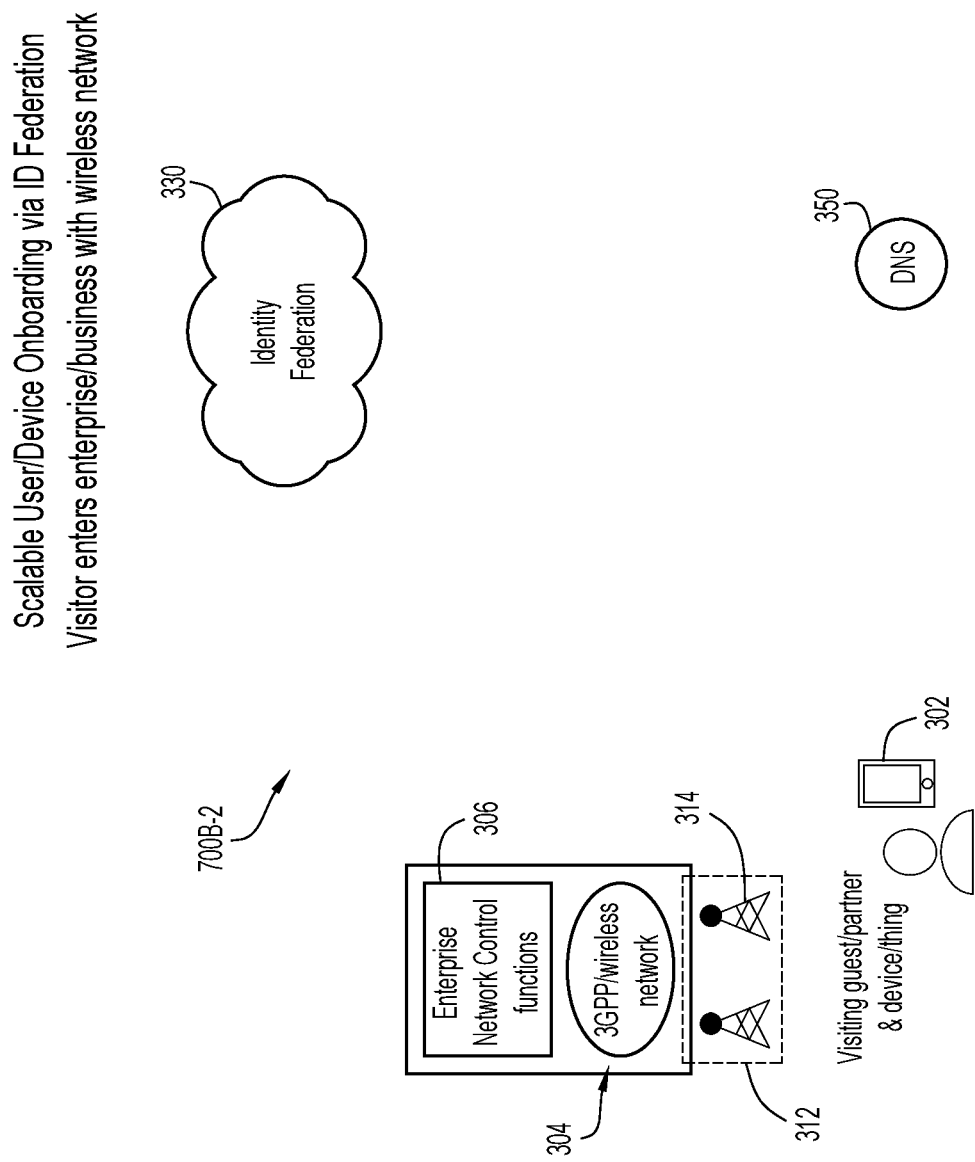
Figures 3, 7B:
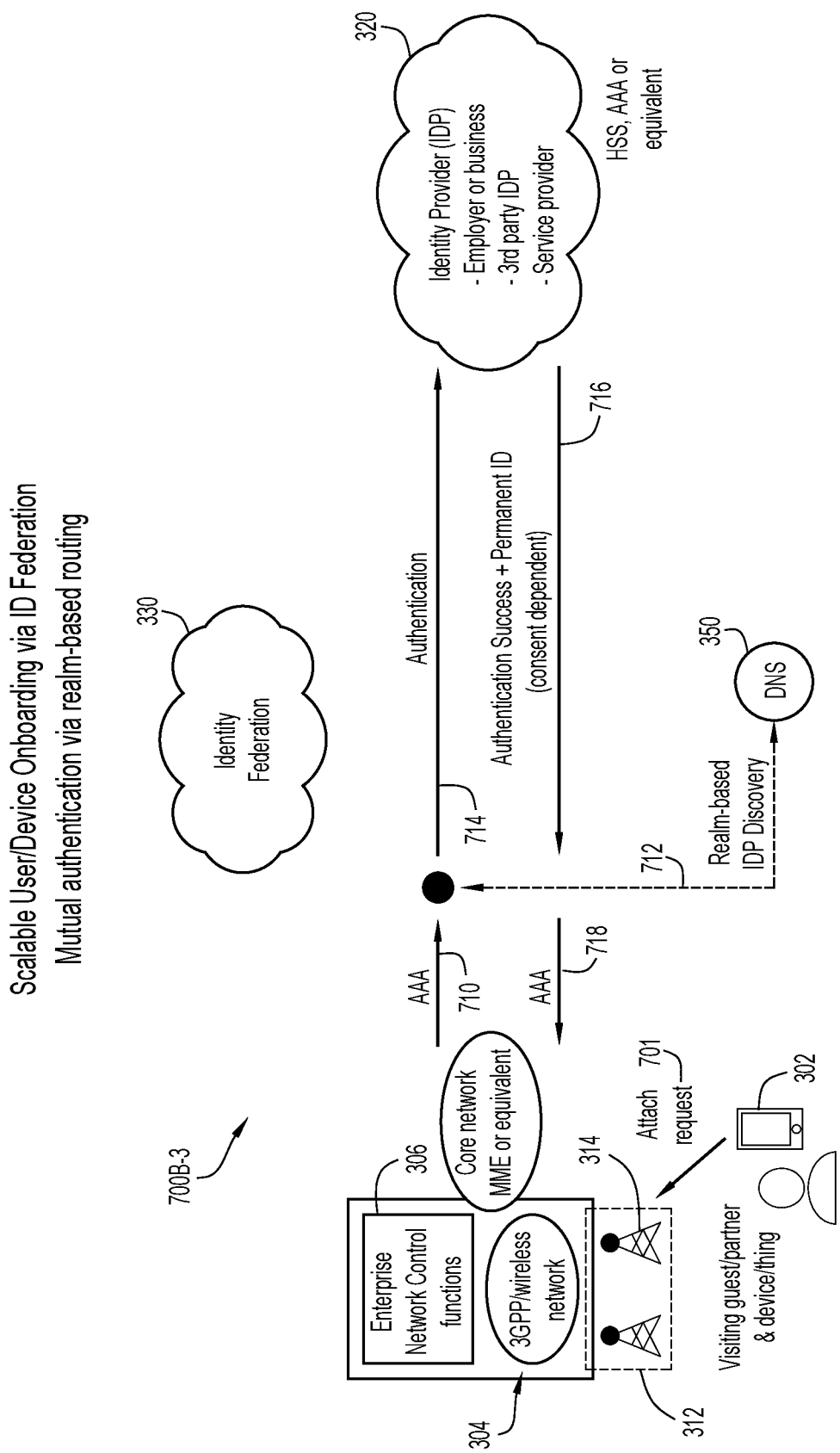
Figures 4, 7B:
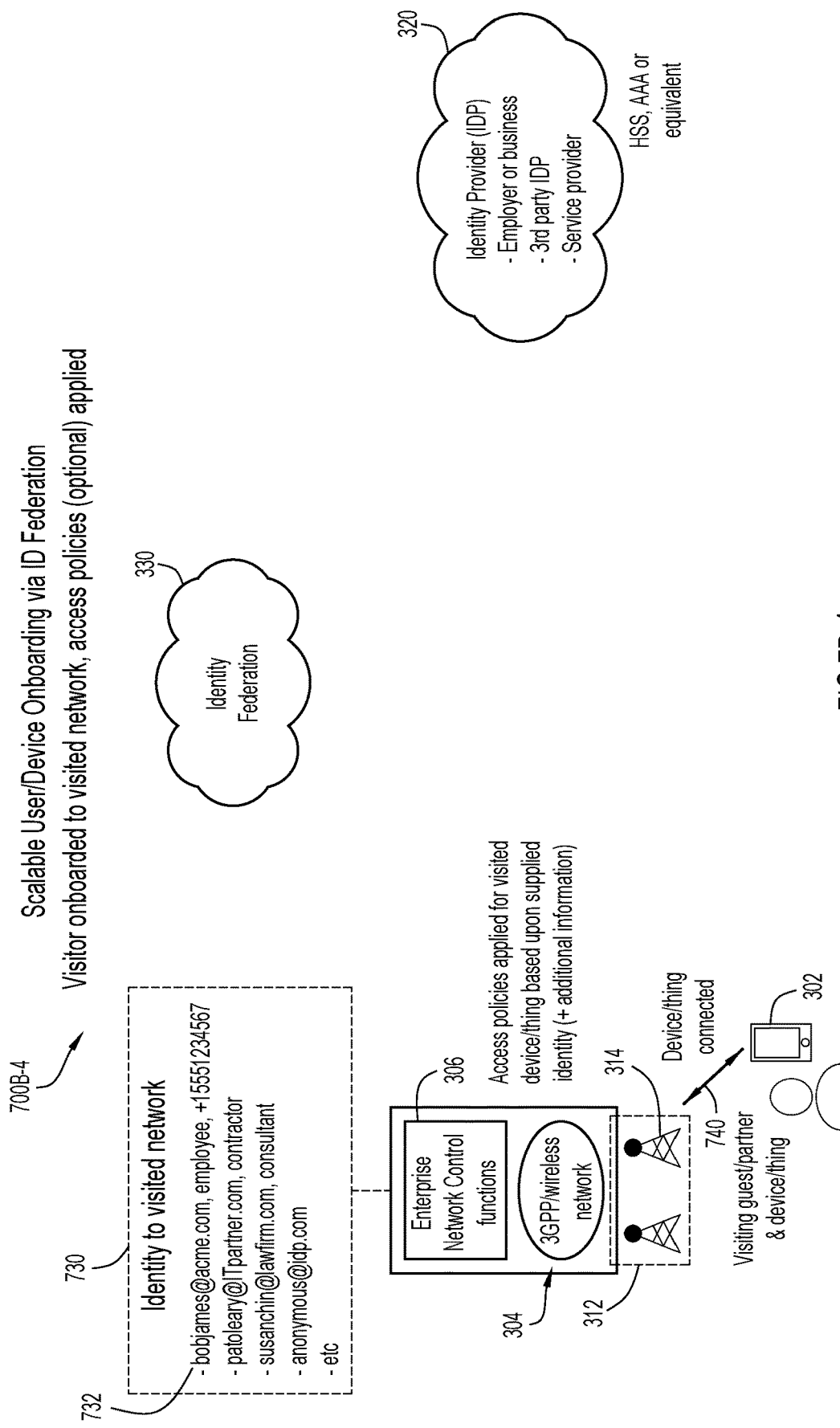

Beginning with reference specifically to FIG. 7B-1, a process flow diagram 700B-1 of part of the process flow of FIGS. 7B-1 through 7B-4 relates to an initial configuration and/or registration steps for access providers (e.g. private 3GPP-based networks) and identity providers. An access provider registration procedure 722 may be performed for the access provider (i.e. 3GPP-based network 304 and/or the enterprise associated therewith). The access provider registration procedure 722 may include an onboarding procedure 702 with identity federation 330 (e.g. between or on behalf of the access provider and identity federation 330). An identity provider registration procedure 724 may also be performed for identity provider 320. The identity provider registration procedure 724 may also include an onboarding procedure 704 with identity federation 330 (e.g. between or on behalf of identity provider 320 and identity federation 330). In the onboarding procedures 702 and 704, digital certifications are provided to the identity federation peers (e.g. 3GPP-based network 304 and identity provider 320) from the root of trust, as verification was provided by the root of trust. The identity provider registration procedure 724 may also include a DNS configuration procedure 708 with DNS server 350. DNS configuration procedure 708 may include populating DNS server 350 with records (e.g. NAPTR and/or SRV records) for associating a realm name of realm associated with identity provider 320 with one or more host names which are respectively associated with one or more service names of services (e.g. one or more various types of authentication services or procedures).

Next, with reference specifically to FIG. 7B-2, a process flow diagram 700B-2 of part of the process flow of FIGS. 7B-1 through 7B-4 relates to a scenario where device 302 enters an enterprise having 3GPP-based network 304 and wishes to access 3GPP-based network (e.g. as a guest or visiting device). Device 302 may not have an identity or credentials which are (normally) recognizable by 3GPP-based network 304.

Next, with reference specifically to FIG. 7B-3, a process flow diagram 700B-3 of part of the process flow of FIGS. 7B-1 through 7B-4 relates to a guest onboarding of device 302 using realm-based discovery of an identity provider and mutual authentication of identity federation peers. The MME of 3GPP-based network 304 may receive, from device 302 via base station 314, a message indicating an attach request (or other request for a connection, service, or authentication) (step 701 of FIG. 7B-3). The message may include an identity of device 302. Again, as a visitor, device 302 may not have an identity or credentials which are (normally) recognizable by 3GPP-based network 304. Identifying the message may therefore trigger a realm-based discovery of an identity provider. The MME may select or derive a realm name of a realm based on the identity of the device. The MME may send or forward a message indicating an authentication request (step 710 of FIG. 7B-3). Based on one or more queries to DNS server 350 (step 712 of FIG. 7B-3), the MME may obtain an address of a server of identity provider 320 that is mapped to the realm name and provides a (e.g. suitable) authentication service.

Using the address, the server of identity provider 320 may be contacted to establish a secure connection with the server. Here, a mutual authentication procedure with the server may be performed based on digital certificates, where the secure connection with the server of identity provider 320 is established is based on a positive result on both ends. In some implementations, the secure connection may be a TLS connection. An authentication procedure over the secure connection using the authentication service of the server may be performed, for authenticating the UE based on credentials associated with the identity. The authentication procedure may involve an authentication request to be sent to the server of identity provider 320 (step 714 of FIG. 7B-3). A response including a result may be received from the server of identity provider 320 (steps 716 and 718 of FIG. 7B-3). A permanent identity and/or other attributes associated the device 302, subscriber, or user may be received from identity provider 320. The receipt of this additional information may be consent-dependent. Based on a result of the authentication procedure, device access of device 302 to the 3GPP-based network 304 may be permitted or denied.

Next, with reference specifically to FIG. 7B-4, a process flow diagram 700B-4 of part of the process flow of FIGS. 7B-1 through 7B-4 relates to device 302 being successfully onboarded onto the (visited) 3GPP-based network 304 as a visitor, where policies for access and/or communications are applied based on the identity (i.e. including any subsequently-received, permanent identity and/or other attributes). Device 302 is shown to have a connection 740 for access and communication with 3GPP-based network 304. With quick reference back to FIG. 7A, at network control functions 306, device 302 may be associated with a list of records 730 indicating identities and information associated with the identities. The list of records 730 may include identities and associated information for all of various visitors and/or guests, where different policies may be applied (see also e.g. FIG. 7B-4). In FIG. 7A, the list of records 730 includes a first record 732 which includes a first identity(s) corresponding to bob@acme.com, +15551234567, who is an employee; and a second record 734 which includes a second identity corresponding to an anonymous guest.

Figure 8:
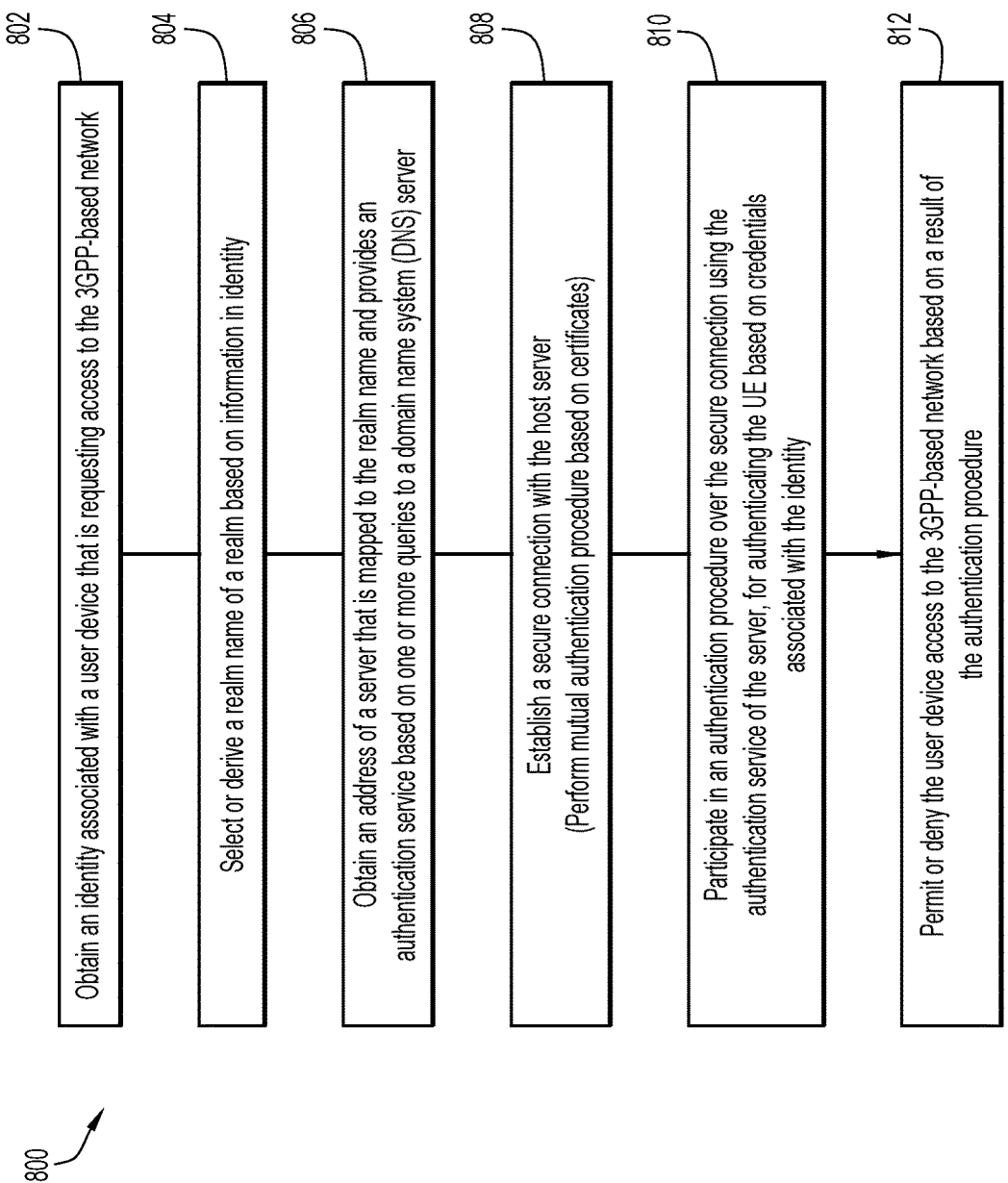
FIG. 8 is a flowchart of a method for use in guest onboarding of a device in a 3GPP-based network according to some implementations.

Referring now to FIG. 8, a flowchart 800 of a method for guest onboarding of a user device in a 3GPP-based network according to some implementations is shown. In some implementations, the 3GPP-based network is or is part of an enterprise private 3GPP network. The method may be performed by one or more network nodes or computing devices of the 3GPP-based network. More particularly, the method may be performed by one or more control plane functions of the 3GPP-based network, such as or including a control plane function for mobility management (e.g. an MME in an LTE/EPC based network, or an AMF in a 5G-based network). The method may be embodied in a computer program product which includes a non-transitory computer readable medium and instructions stored in the non-transitory computer readable medium, where the instructions are executable by one or more processors for performing the method. Various implementations of the method of FIG. 8 may be realized with use of any of the above-described features, details, components and architectures described above in relation to the previous figures.

To begin, an identity associated with a device that is requesting access to the 3GPP-based network may be obtained (step 802 of FIG. 8). In some implementations, the identity may be obtained from a message received from the device that is requesting the access to the 3GPP-based network. The message may be a message indicating a request for a connection, attachment, service, or authentication with or via the 3GPP-based network, as examples. In example implementations, the identity may be obtained from a message indicating an attach request and/or from a message which is an Initial UE message. In some implementations, the identity may be or include an IMSI of the device. A realm name of a realm may be selected or derived based on information in the identity (step 804 of FIG. 8). In some implementations, the realm name may be selected or derived from an identity which may be or include the IMSI of the device. In some implementations, the realm name may be selected or derived from a realm name or a domain name in the identity.

Next, an address of a server that is mapped to the realm name and provides an authentication service may then be obtained, based on one or more queries to a DNS server (step 806 of FIG. 8). The server is associated with a peer of an identity provider which is registered in an identity federation and is external to the 3GPP-based network. The address of the server may be or include an IP address. In preferred implementations, the server may be discovered based on one or more queries of the DNS server using techniques described in relation to FIG. 9 (e.g. based on NAPTR and/or SRV record lookups).

Using the address, the server may be contacted to establish a secure connection with the server (step 808 of FIG. 8). Here, a mutual authentication procedure with the server may be performed based on digital certificates, where the secure connection with the host server is established is based on a result of performing the mutual authentication procedure. The mutual authentication procedure may be based on verification of digital certificates (i.e. those digital certificates that are distributed to the 3GPP-based network and the identity provider via the identity federation). In some implementations, the secure connection which may be a TLS connection. An authentication procedure over the secure connection using the authentication service of the server may be performed, for authenticating the UE based on credentials associated with the identity (step 810 of FIG. 8). Device access to the 3GPP-based network may be permitted or denied based on a result of the authentication procedure (step 812 of FIG. 8). One or more policies for device access and/or communications in the 3GPP-based network may be applied based on the identity.

In some implementations, the credentials are associated with a SIM of the device for 3GPP access to a public 3GPP network. In some other implementations, the credentials are associated with access to a user account of an application of the device for a service associated with an identity provider.

Figure 9:
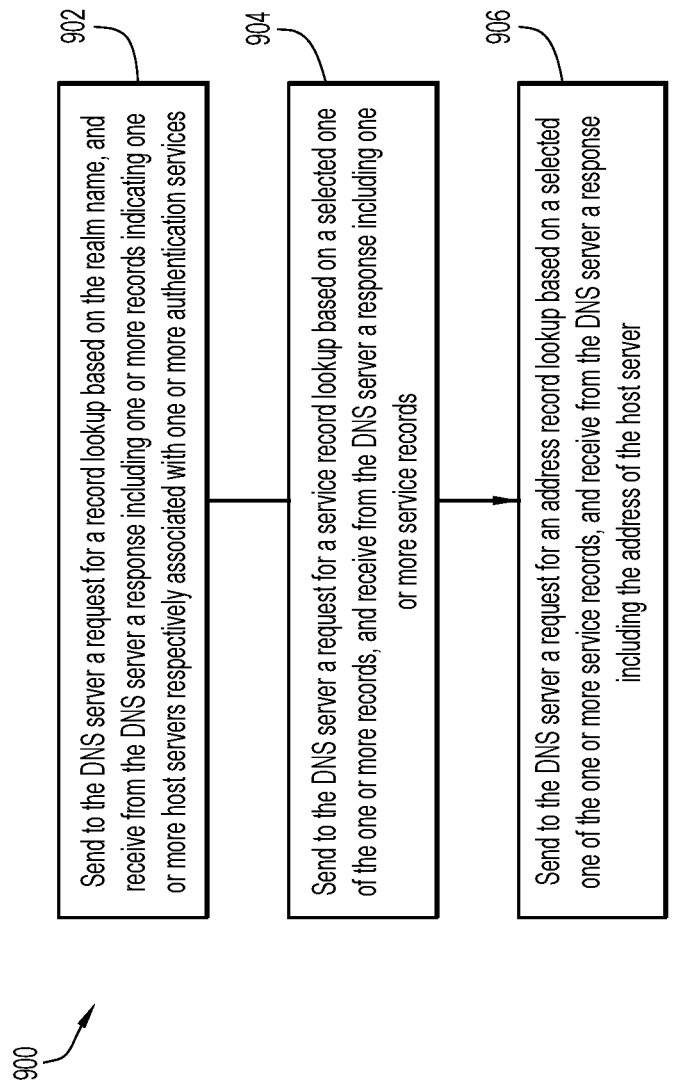
FIG. 9 is a flowchart of a method for use in guest onboarding of a user device in a 3GPP-based network according to some implementations, which may be utilized in the method described in relation to FIG. 8.

FIG. 9 is a flowchart 900 of a method for use in guest onboarding of a user device in a 3GPP-based network according to some implementations. In some implementations, the method of FIG. 9 may be performed in relation to step 808 of FIG. 8. The method may be performed by one or more network nodes or computing devices of the 3GPP-based network. The method may be embodied in a computer program product which includes a non-transitory computer readable medium and instructions stored in the non-transitory computer readable medium, where the instructions are executable by one or more processors for performing the method. Various implementations of the method of FIG. 9 may be realized with use of any of the above-described features, details, components and architectures described above in relation to the previous figures.

In FIG. 9, any one or more (or all) of the steps may be used for obtaining the address of the server that is or is associated with a peer of an identity provider that is registered in the identity federation. To begin, a request for a record lookup based on a realm name of a realm may be sent to a DNS server, and a response including one or more records indicating one or more servers or host servers (having host names) respectively associated with one or more authentication services may be received from the DNS server (step 902 of FIG. 9). In some implementations, the record lookup may be a NAPTR record lookup. In some implementations, the record lookup may be associated with host servers that provide an authentication service such as an AAA service. A request for a service record lookup based on a selected one of the one or more may then be sent to the DNS server, and a response including one or more service records may be received from the DNS server (step 904 of FIG. 9. In some implementations, the record lookup may be a SRV record lookup. In some implementations, the service record lookup may be associated with host servers that provide a particular authentication service, including a RADIUS service, a Diameter service, a REST API authentication service, or an open standard protocol for authorization service or OAuth (e.g. OAuth 2.0). A request for an address record lookup based on a selected one of the one or more service records may then be sent to the DNS server, and a response including the address of the host server may be received from the DNS server (step 906 of FIG. 9).

According to some implementations of the embodiments shown and described above in relation to FIGS. 3-9, the network may transmit or broadcast one or more messages including one or more information elements indicating a presence of a network that is configured and/or available to participate in a guest onboarding scheme of the present disclosure (e.g. as a participant in the identity federation for guest onboarding). Based on receipt and processing of the one or more information elements indicating the presence of the network configured and/or available to participate in the guest onboarding scheme, a UE may be triggered to scan, discover, identify, or communicate with the 3GPP-based network for guest onboarding according to the present disclosure. Here, the network may be or include an enterprise private network which includes the 3GPP-based network. In some implementations, the enterprise private network may include the 3GPP-based network for 3GPP-based access and further include a non-3GPP network (e.g. Wi-Fi or IEEE 802.11 network) for non-3GPP-based access. In some implementations, the one or more information elements may be or include an Organization Identifier (OI) or a Roaming Consortium OI (RCOI) indicating the presence of the network configured and/or available to participate in the guest onboarding scheme (e.g. as a participant in the identity federation for guest onboarding). In example implementations, the one or more information elements indicating presence of the network for guest onboarding may be (regularly) broadcasted in a beacon message or beacon frame from the non-3GPP network of the enterprise or even the 3GPP-based network.

Figure 10:
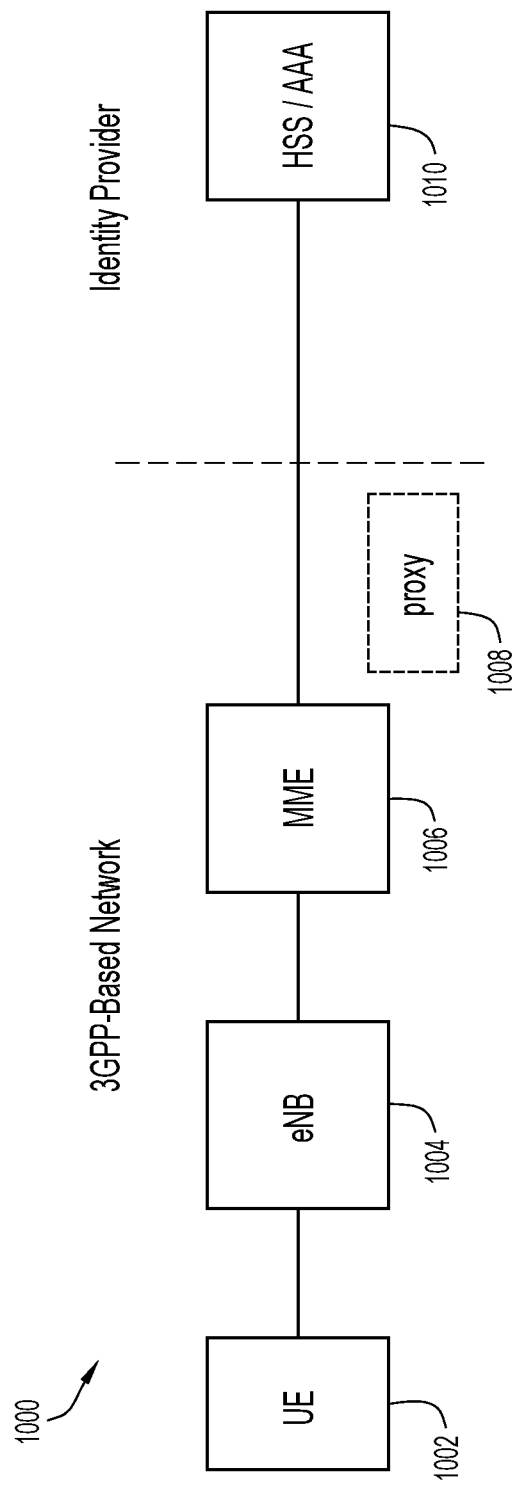
FIG. 10 is a basic network architecture of a private 3GPP-based network for guest onboarding of a device according to some implementations, which is based on a Fourth Generation (4G)/LTE/EPC network architecture.

FIG. 10 is a basic network architecture 1000 of a private 3GPP-based network for guest onboarding of a device according to some implementations. Network architecture 1000 of FIG. 10 is based on an LTE/EPC network architecture, and may include an MME 1006 and one or more eNBs, such as an eNB 1004, for communication with a UE 1002 or other device. The private 3GPP-based network may be privately-owned and operated by an enterprise (e.g. not an MNO), but provide authentication of UE 1002 (i.e. a guest) for (guest) network access based on credentials associated with its MNO-provided SIM (e.g. or other identity or credential). One or more control plane functions of the 3GPP-based network, including a control plane function for mobility management such as MME 1006, may interact with a server associated with a peer of an identity provider for 4G/LTE/EPC-related authentication. In addition or as an alternative, a proxy 1008 may be utilized for some or all of the functions associated with the guest onboarding. The server associated with the peer may be or include HSS or AAA server 1010.

Figure 11:
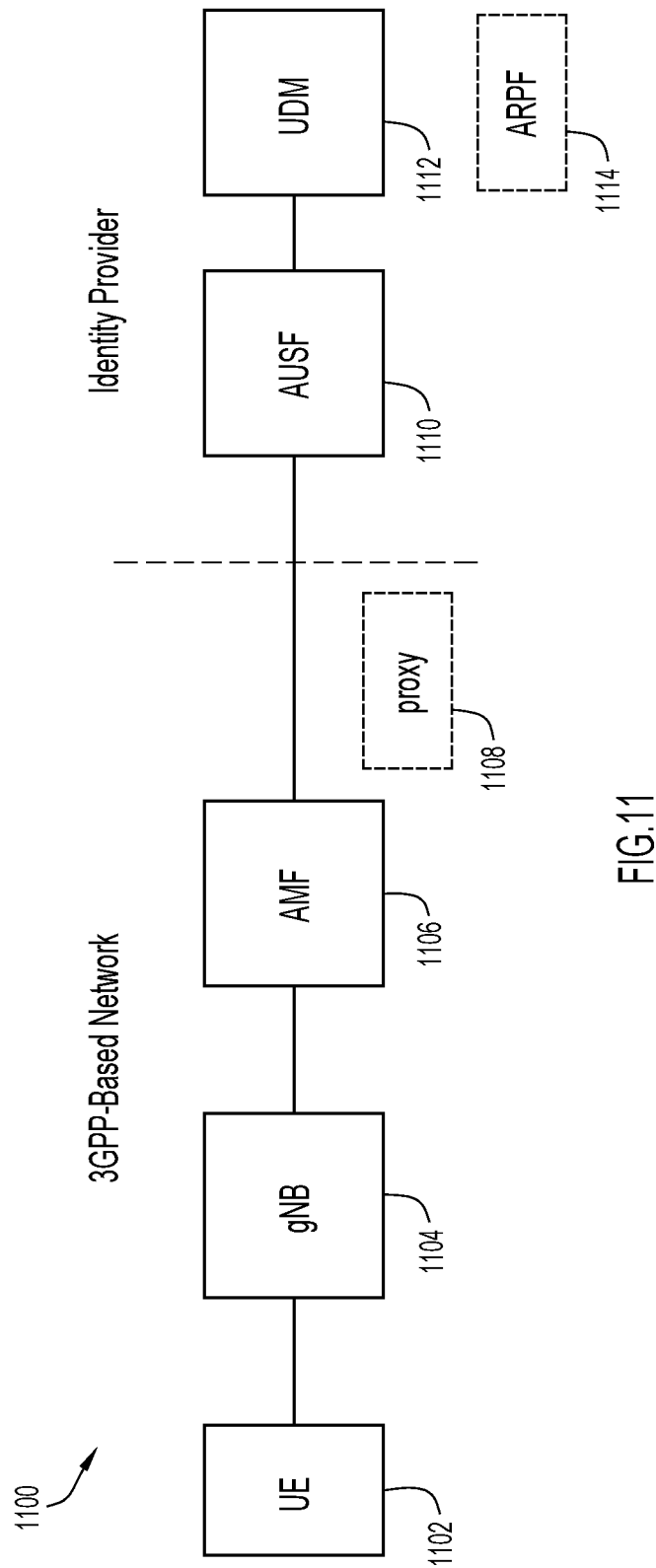
FIG. 11 is a basic network architecture of a private 3GPP-based network for guest onboarding of a device according to some implementations, which is an example Fifth Generation (5G) network equivalent of that shown and described in relation to FIG. 10.

FIG. 11 a basic network architecture 1100 of a private 3GPP-based network for guest onboarding of a device according to some implementations. As is apparent, network architecture 1100 of FIG. 11 is an example 5G network equivalent to that shown in relation to FIG. 10. Network architecture 1100 of FIG. 11 may include an AMF 1106 and one or more gNBs, such as a gNB 1104, for communication with a UE 1102 or other device. The private 3GPP-based network may be privately-owned and operated by an enterprise (e.g. not an MNO), but provide authentication of UE 1002 (i.e. a guest) for (guest) network access based on credentials associated with its MNO-provided SIM (e.g. or other identity or credential). One or more control plane functions of the 3GPP-based network, including a control plane function for mobility management such as AMF 1106, may interact with a server associated with a peer of an identity provider for 5G-type authentication. In addition or as an alternative, a proxy 1108 may be utilized for some or all of the functions associated with the guest onboarding. The server associated with the peer may be or include a Unified Data Management (UDM 1112) and/or an Authentication Server Function (AUSF) 1110. UDM 1112 may include or be associated with an Authentication Credential Repository and Processing Function (ARPF) 1114.

Several advantages are provided by use of the techniques and mechanisms of the present disclosure, and the realized and perceived advantage(s) will depend on the specific implementation.

Advantageously, techniques and mechanisms of the present disclosure may allow public and private 3GPP networks to securely and "frictionlessly" onboard devices according to a wide range of identities (e.g. service provider, enterprise/industrial, IoT identities, web-based identities, etc.) in a wide range of access networks (including service provider, enterprise/industrial, etc.).

In at least some implementations, what is provided is a simple approach that is able to scale to a wide range of different identity providers and access providers. The techniques and mechanisms may provide cost-effective support for a roaming framework that may scale to hundreds of thousands of participants (e.g. compare to the low 100's that IPXs presently serve). IPXs imply significant cost and are presently designed for a small number of large MNOs rather than for a large number of enterprises. With the growing convergence of Wi-Fi and LTE/5G for private enterprises, there is great value in having a common, simple, secure and scalable authentication and roaming mechanism.

In at least some implementations, the techniques and mechanisms of the present disclosure may support (e.g. any) identity providers which may be MNOs (including e.g. Mobile Virtual Network Operators "MVNOs"), businesses, enterprises, or identity providers (e.g. web-based identity providers). Advantageously, in at least some implementations, the techniques and mechanisms of the present disclosure may support (e.g. any) 3GPP-supported identities as well as additional identities introduced by other forums (e.g. MulteFire Alliance, CBRS Alliance, etc.), including SIM, eSIM, digital certificates, etc. It may also be compatible with the CBRS Alliance's Shared Home Network Indicator (SHNI) mechanism. Advantageously, in at least some implementations, the techniques and mechanisms of the present disclosure may support various authentication procedures and/or protocols for device authentication, including, for example, RADIUS, Diameter, REST API authentication, and OAuth.

In at least some implementations, the techniques and mechanisms of the present disclosure may support various access provider technologies, including 4G/LTE, Wi-Fi, 5G New Radio (5G-NR), 5G-NR Unlicensed Spectrum (5G NR-U), future Sixth Generation (6G) and beyond, etc. As such, it can provide a common authentication approach spanning multiple access technologies deployed within a private enterprise, an MSP, or other network operator. For implementations relating to 4G/LTE, what may be supported are the same authentication protocols and 3GPP reference points associated with 4G/LTE (e.g. S6a for authentication); and so on with respect to authentication protocols for other access technologies. Advantageously, in at least some implementations, the techniques and mechanisms of the present disclosure may be utilized in relation to a number of different types of devices, including user devices, UEs, IoT devices, and M2M devices, etc., and applicable to a wide range of device categories such as smartphones, tablets, and other devices.

In at least some implementations, the techniques and mechanisms of the present disclosure may support the use of various access and/or communication policies based on the identity, for example, QoS, access connection lists such as allowed and/or disallowed lists, inline services, security policies, geo- and location policies, throughput or bandwidth policies, and/or segmentation.

In at least some implementations, the techniques and mechanisms of the present disclosure need only minor or minimal changes to the 3GPP-based network. In at least some of these implementations, the techniques and mechanisms of the present disclosure may be facilitated without impacting authentication call flows between a 3GPP-compliant device and the 3GPP-based network. In at least some of these implementations, changes to support the techniques and mechanisms would be minor modifications to core network functionality (e.g. mobility management, session management, authentication elements, etc.).

In at least some implementations, the techniques and mechanisms of the present disclosure may enable public and private 3GPP networks with the equivalent guest authentication and roaming benefits that "OpenRoaming" technology provides for Wi-Fi networks.

Figure 12:
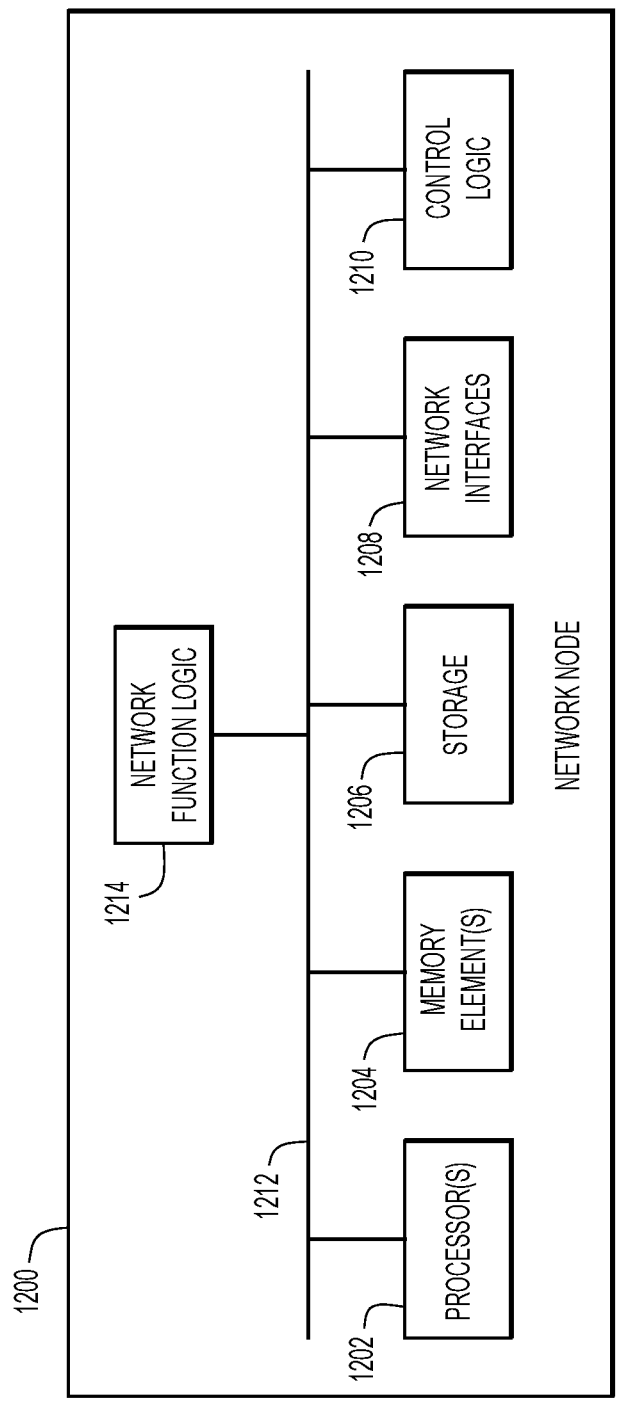
FIG. 12 is a schematic block diagram of a network node (e.g. a computing node) having control plane functionality (e.g. one or more control plane function(s) for mobility management) according to some implementations of the present disclosure.

FIG. 12 is a schematic block diagram of a network node 1200 (e.g. a computing node) having control plane functionality (e.g. one or more control plane function(s) for mobility management) according to some implementations of the present disclosure.

In various embodiments, network element functionality may be performed using any combination of network nodes. In various embodiments, network node 1200 can be implemented as, for example, a data center network node such as a server, rack of servers, multiple racks of servers, etc., for a data center; or a cloud network node, which may be distributed across one or more data centers.

In some implementations, network node 1200 may include one or more processors 1202, one or more memory elements 1204, storage 1206, network interfaces 1208, control logic 1210 and network function logic 1214. In some implementations, processors 1202 are at least one hardware processor configured to execute various tasks, operations and/or functions for network node 1200 as described herein according to software and/or instructions configured for network node 1200. In some implementations, memory elements 1204 and/or storage 1206 are configured to store data, information, software, instructions, logic (e.g. any logic 1210 and/or 1214), data structures, combinations thereof, or the like for various embodiments described herein. Note that in some implementations, storage may be consolidated with memory elements (or vice versa), or may overlap/exist in any other suitable manner.

In some implementations, network interfaces 1208 enable communication between for network node 1200 and other network elements, systems, slices, etc. that may be present in the system to facilitate operations as discussed for various embodiments described herein. In some implementations, network interfaces 1208 may include one or more Ethernet drivers and/or controllers, Fiber Channel drivers, and/or controllers, or other similar network interface drivers and/or controllers to enable communications for network node 1200 within the system.

In some implementations, control logic 1210 may include instructions that, when executed (e.g. via processors 1202), cause for network node 1200 to perform operations, which may include, but not be limited to, providing overall control operations of network node 1200; cooperating with other logic, data structures, etc. provisioned for and/or maintained by network node 1200; combinations thereof; or the like to facilitate various operations as discussed for various embodiments described herein.

In some implementations, bus 1212 may be configured as an interface that enables one or more elements of network node 1200 (e.g. processors 1202, memory elements 1204, logic, etc.) to communicate in order to exchange information and/or data. In at least one embodiment, bus 1212 may be implemented as a fast kernel-hosted interconnect, potentially using shared memory between processes (e.g. logic, etc.), which may enable efficient communication paths between the processes. In some implementations, network function logic 1214 may include instructions that, when executed (e.g. via one or more processors 1202), cause network node 1200 to perform one or more operations for one or more network elements as discussed for various implementations described herein.

In some implementations, each of the elements of the system may couple to one another through simple interfaces or through any other suitable connection (wired or wireless), which provides a viable pathway for network communications. As referred to herein, a physical (wired or wireless) interconnection or interface may refer to an interconnection of one element or node with one or more other element(s), while a logical interconnection or interface may refer to communications, interactions and/or operations of elements with each other, which may be directly or indirectly interconnected, in a network environment.

The terms 'data', 'information', 'parameters' and variations thereof as used herein may refer to any type of binary, numeric, voice, video, textual or script data or information or any type of source or object code, or any other suitable data or information in any appropriate format that may be communicated from one point to another in electronic devices and/or networks. Additionally, messages, requests, responses, replies, queries, etc. are forms of network traffic and, therefore, may comprise one or more packets.

In some implementations, a network may be associated with and/or provided by a single network operator or service provider and/or multiple network operators or service providers. In various embodiments, the network node may include and/or overlap with, in whole or in part, one or more packet data network(s) (e.g. one or more packet data networks). A network may offer communicative interfaces between various elements and may be further associated with any LAN, wireless local area network (WLAN), metropolitan area network (MAN), wide area network (WAN), virtual private network (VPN), RAN, virtual local area network (VLAN), enterprise network, Intranet, extranet, Low Power Wide Area Network (LPWAN), Low Power Network (LPN), M2M network, IoT Network, or any other appropriate architecture or system that facilitates communications in a network environment.

The terms 'user device,' 'mobile device,' 'mobile radio device,' 'end device', 'user', 'subscriber' or variations thereof can be used herein interchangeably and are inclusive of devices used to initiate a communication, such as a computer, an electronic device such as an IoT device (e.g. an appliance, a thermostat, a sensor, a parking meter, etc.), a personal digital assistant (PDA), a laptop or electronic notebook, a cellular telephone, an IP phone, an electronic device having cellular and/or Wi-Fi connection capabilities, a wearable electronic device, or any other device, component, element, or object capable of initiating voice, audio, video, media, or data exchanges within the system. A user device may also be inclusive of a suitable interface to a human user such as a microphone, a display, a keyboard, or other terminal equipment.

Note that in some implementations, operations as outlined herein to facilitate techniques of the present disclosure may be implemented by logic encoded in one or more tangible media, which may be inclusive of non-transitory tangible media and/or non-transitory computer readable storage media (e.g. embedded logic provided in an ASIC, in digital signal processing (DSP) instructions, software—potentially inclusive of object code and source code—to be executed by a processor, or other similar machine, etc.). In some of these instances, a memory element and/or storage may store data, software, code, instructions (e.g. processor instructions), logic, parameters, combinations thereof or the like used for operations described herein. This includes memory elements and/or storage being able to store data, software, code, instructions (e.g. processor instructions), logic, parameters, combinations thereof, or the like that are executed to carry out operations described herein.

A processor (e.g. a hardware processor) may execute any type of instructions associated with data to achieve the operations detailed herein. In one example, a processor may transform an element or an article (e.g. data, information) from one state or thing to another state or thing. In another example, operations outlined herein may be implemented with logic, which may include fixed logic, hardware logic, programmable logic, digital logic, etc. (e.g. software/computer instructions executed by a processor), and/or one or more of the elements identified herein could be some type of a programmable processor, programmable digital logic (e.g. a field programmable gate array (FPGA), a DSP processor, an EPROM, a controller, an electrically erasable PROM (EE- PROM), or an ASIC) that includes digital logic, software, code, electronic instructions, or any suitable combination thereof.

It is also noted that the operations and steps described with reference to the preceding figures illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that the system (and its teachings) are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, the system may be applicable to other exchanges or routing protocols, interfaces, and/or communications standards, proprietary, and/or non-proprietary. Moreover, although the system has been illustrated with reference to particular elements and operations that facilitate the communication process, these elements, and operations may be replaced by any suitable architecture or process that achieves the intended functionality of the system.

Although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

It will also be understood that, although the terms "first," "second," etc. may be used herein to describe various elements, these elements should not be limited by these terms. These terms are used to distinguish one element from another. For example, a first identity could be termed a second identity, and similarly, a second identity could be termed a first identity, without changing the meaning of the description, so long as all occurrences of the "first identity" are renamed consistently and all occurrences of the "second identity" are renamed consistently. The first identity and the second identity are both identities, but they are not the same identity.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method for use in facilitating an authentication of a device by an identity provider to permit guest access of the device in a Third Generation Partnership Project (3GPP) based network, the method comprising:
   at one or more control plane functions of the 3GPP-based network,
      receiving, from the device, a message which requests access to the 3GPP-based network;
      obtaining, from the message, an identity associated with the device;
      deriving a realm name of a realm from information in the identity, wherein the realm differs from a realm of the 3GPP-based network;
      obtaining, from a response to one or more queries to a domain name system (DNS) server, an address of a server that is mapped to the realm name and provides an authentication service for the authentication, the server being external to the 3GPP-based network and associated with the identity provider which is registered in an identity federation;
      subsequent to obtaining the address of the server, establishing a secure connection with the server using the address obtained from the DNS server;
      participating in an authentication procedure over the secure connection using the authentication service of the server for authenticating the device based on credentials associated with the identity, for permitting the guest access of the device in the 3GPP-based network; and
      applying one or more policies for the guest access or communications of the device in the 3GPP-based network based on the identity or a permanent identity or other attributes received from the identity provider in the authentication procedure.

2. The method of claim 1, further comprising:
   at the one or more control plane functions of the 3GPP-based network, performing a mutual authentication procedure with the server based on digital certificates that are distributed via the identity federation,
wherein establishing the secure connection with the server is based on a result of performing the mutual authentication procedure.

3. The method of claim 1, wherein:
the message which requests access to the 3GPP-based network comprises an Initial UE message for registration,
the identity associated with the device comprises an International Mobile Subscriber Identity (IMSI), and
the identity associated with the device is not recognizable by the 3GPP-based network.

4. The method of claim 1,
wherein the applying the one or more policies for the guest access or communications of the device in the 3GPP-based network comprises permitting or denying the guest access of the device in the 3GPP-based network based on a result of the authentication procedure.

5. The method of claim 1, wherein the address of the server is obtained based on the one or more queries to the DNS server by:
sending to the DNS server a request for a record lookup based on the realm name, and receiving from the DNS server a response including one or more records indicating one or more host servers respectively associated with one or more authentication services.

6. The method of claim 1, wherein the authentication service comprises one of a Remote Authentication Dial-In User Service (RADIUS), a Diameter service, a Representational State Transfer (REST) Application Programming Interface (API) authentication service, or an open standard protocol for authorization service or OAuth.

7. The method of claim 1, wherein the 3GPP-based network comprises an enterprise private 3GPP network and the one or more control plane functions of the 3GPP-based network comprise one or more control plane functions of the enterprise private 3GPP network.

8. The method of claim 5, wherein the address of the server is obtained based on the one or more queries to the DNS server further by:
selecting one of the one or more authentication services as a selected authentication service according to a requirement or a preference; and
sending to the DNS server a request for a service record lookup based on a selected one of the one or more records corresponding to the selected authentication service, and receiving from the DNS server a response including one or more service records.

9. The method of claim 7, wherein participating in the authentication procedure comprises:
participating in the authentication procedure for authenticating the device based on the credentials that are associated with a subscriber identity module (SIM) for the device for 3GPP access to a public 3GPP network.

10. The method of claim 7, wherein:
the message which requests access to the 3GPP-based network comprises an Initial UE message for registration,
the identity associated with the device has a format of <IMSI>@<realm>, where the IMSI is an International Mobile Subscriber Identity associated with a subscription of the device in a home 3GPP-based network, and the information from which the realm name is derived comprises the realm in the identity or the IMSI in the identity.

11. The method of claim 8, wherein the address of the server is obtained based on the one or more queries to the DNS server by:
sending to the DNS server a request for an address record lookup based on a selected one of the one or more service records, and receiving from the DNS server a response including the address of the server.

12. The method of claim 11, wherein the one or more records comprise one or more Name Authority Pointer (NAPTR) records and the one or more service records comprises one or more service (SRV) records.

13. A computer program product comprising:
a non-transitory computer readable medium; and
instructions stored in the non-transitory computer readable medium;
the instructions being executable by one or more processors for facilitating an authentication of a device by an identity provider to permit or deny guest access of the device in a Third Generation Partnership Project (3GPP) based network, by:
receiving, from the device, a message which requests access to the 3GPP-based network;
obtaining, from the message, an identity associated with the device;
deriving a realm name of a realm from information in the identity, wherein the realm differs from a realm of the 3GPP-based network;
obtaining, from a response to one or more queries to a domain name system (DNS) server, an address of a server that is mapped to the realm name and provides an authentication service for the authentication, the server being external to the 3GPP-based network and associated with the identity provider which is registered in an identity federation;
subsequent to obtaining the address of the server, establishing a secure connection with the server using the address obtained from the DNS server;
participating in an authentication procedure over the secure connection using the authentication service of the server, for authenticating the device based on credentials associated with the identity; and
permitting or denying the guest access of the device in the 3GPP-based network based on a result of the authentication procedure and the identity, a permanent identity or other attributes received from the identity provider in the authentication procedure.

14. The computer program product of claim 13, wherein the instructions are executable by the one or more processors further for:
performing a mutual authentication procedure with the server based on digital certificates that are distributed via the identity federation,
wherein establishing the secure connection with the server is based on a result of performing the mutual authentication procedure.

15. The computer program product of claim 13, wherein the 3GPP-based network comprises an enterprise private 3GPP network.

16. A Third Generation Partnership Project 3GPP-based network comprising:
one or more 3GPP base stations for communication with a device; and
a control plane function for mobility management and/or proxy thereof which is operative to facilitate an authentication of the device by an identity provider to permit guest access of the device in the 3GPP-based network, by being configured to:
receive, from the device, a message which requests access to the 3GPP-based network;
obtain, from the message, an identity associated with the device;
derive a realm name of a realm from information in the identity, wherein the realm differs from a realm of the 3GPP-based network;
obtain, from a response to one or more queries to a domain name system (DNS) server, an address of a server that is mapped to the realm name and provides an authentication service for the authentication, the server being external to the 3GPP-based network and associated with the identity provider which is registered in an identity federation;
subsequent to obtaining the address of the server, establish a secure connection with the server using the address obtained from the DNS server;
participate in an authentication procedure over the secure connection using the authentication service of the server for authenticating the device based on credentials associated with the identity, for permitting the guest access of the device in the 3GPP-based network; and
apply one or more policies for the guest access or communications of the device in the 3GPP-based network based on the identity or a permanent identity or other attributes received from the identity provider in the authentication procedure.

17. The 3GPP-based network of claim 16, wherein the control plane function for mobility management or proxy thereof is further configured to:
participate in the authentication procedure by participating in the authentication procedure for authenticating the device based on the credentials that are associated with a subscriber identity module (SIM) for the device for 3GPP access to a public 3GPP network.

18. The 3GPP-based network of claim 16, wherein:
the message which requests access to the 3GPP-based network comprises an Initial UE message for registration,
the identity associated with the device has a format of <IMSI>@<realm>, where the IMSI is an International Mobile Subscriber Identity associated with a subscription of the device in a home 3GPP-based network, and
the information from which the realm name is derived comprises the realm in the identity or the IMSI in the identity.

19. The 3GPP-based network of claim 16, wherein the control plane function for mobility management and/or proxy thereof is further configured to:
send to the DNS server a request for a record lookup based on the realm name, and receive from the DNS server a response including one or more records indicating one or more host servers respectively associated with one or more authentication services, wherein the request for the record lookup based on the realm name comprises a Name Authority Pointer (NAPTR) record lookup for one or more records comprising one or more NAPTR records;
selecting one of the one or more authentication services as a selected authentication service according to a requirement or a preference;
send to the DNS server a request for a service record lookup based on a selected one of the one or more NAPTR records corresponding to the selected authentication service, and receive from the DNS server a response including one or more service records, wherein the request for the service record lookup comprises a service (SRV) record lookup for one or more service records comprising one or more SRV records; and
send to the DNS server a request for an address record lookup based on a selected one of the one or more SRV records, and receive from the DNS server a response including the address of the server for the authentication.

20. The 3GPP-based network of claim 16, wherein the 3GPP-based network comprises an enterprise private 3GPP network.

* * * * *